United States Patent

Nakaoka et al.

Patent Number: 5,909,317
Date of Patent: Jun. 1, 1999

[54] DISTORTION CORRECTED IMAGE DISPLAY APPARATUS

[75] Inventors: Masaya Nakaoka, Hachioji; Takayoshi Togino, Koganei; Junko Takahashi, Atsugi, all of Japan

[73] Assignee: Olympus Optical Co., Ltd., Tokyo, Japan

[21] Appl. No.: 08/822,554

[22] Filed: Mar. 19, 1997

[30] Foreign Application Priority Data

Mar. 19, 1996 [JP] Japan .................................. 8-063228

[51] Int. Cl.⁶ ............................................. G02B 27/14
[52] U.S. Cl. ........................................... 359/631; 359/633
[58] Field of Search ................................. 359/630, 631, 359/633; 345/7, 8

[56] References Cited

U.S. PATENT DOCUMENTS

| | | | |
|---|---|---|---|
| 5,093,567 | 3/1992 | Staveley | 250/221 |
| 5,459,612 | 10/1995 | Ingleton | 359/630 |
| 5,633,833 | 5/1997 | Nanba et al. | 359/631 |
| 5,687,025 | 11/1997 | Nanba | 359/633 |
| 5,699,194 | 12/1997 | Takahashi | 359/633 |
| 5,714,967 | 2/1998 | Okamura et al. | 345/8 |

FOREIGN PATENT DOCUMENTS

| | | |
|---|---|---|
| 687-932 | 12/1995 | European Pat. Off. . |
| 3-101709 | 4/1991 | Japan . |
| 7-104209 | 4/1995 | Japan . |

Primary Examiner—Georgia Epps
Assistant Examiner—Ricky Mack
Attorney, Agent, or Firm—Pillsbury Madison & Sutro LLP

[57] ABSTRACT

An image display apparatus corrected for distortions, particularly, a distortion which is asymmetric with respect to the center of the image field. The apparatus includes an image display device (8), and an ocular optical system (42) having a rotationally asymmetric optical surface or a decentered optical surface having a power. The apparatus satisfies the condition of $|\tan \Theta_1 - \tan \Theta_2|/\tan \Theta_1 < 0.1$, where $\Theta_1$ is an angle made between a light ray emitted from an arbitrary point (44) on the image display device (8) and passing through the center of an exit pupil (40) and a visual axis (41), that is, a straight line connecting the center of an observer's pupil and the center of a projected image of the image display device (8), and $\Theta_2$ is an angle made between the visual axis (41) and a light ray emitted from a point (45) which is in point symmetry with the arbitrary point (44) about the center (43) of the image display surface of the image display device (8) and passing through the center of the exit pupil (40).

37 Claims, 12 Drawing Sheets

Left

Right

Left

Right

Left

Right

Left

Right

DISTORTION CORRECTED IMAGE DISPLAY APPARATUS

BACKGROUND OF THE INVENTION

1. Field of the Invention

The present invention relates to an image display apparatus and, more particularly, to a head- or face-mounted image display apparatus which is fitted on a user's head or face to enable the user to enjoy viewing an image.

2. Related Art

In recent years, head- or face-mounted image display apparatuses have been developed for the purpose of enabling the user to enjoy a wide-screen image personally.

These image display apparatuses have been demanded to be small in both size and weight and superior in portability or mountability, that is, capable of being favorably fitted on the user's head or face. Accordingly, an ocular optical system for projecting and leading an image to an observer's eyeball has also been demanded to be reduced in both size and weight.

In general, however, an ocular optical system produces a distortion of the virtual image. Particularly, in a case where an optical element that has a power is decentered in the ocular optical system, or the optical system has a rotationally asymmetric optical surface, e.g. an anamorphic surface or a toric surface, a distortion which is asymmetric with respect to the center of the image field occurs in general.

For example, let us consider an optical system according to Example 1 of Japanese Patent Application Unexamined Publication (KOKAI) No. 7-104209. As shown in FIG. 20, assuming that $\Theta_1$ is an angle made between a visual axis 41 and a light ray emitted from an arbitrary point 44 on an image display surface 8 and passing through the center of an observer's pupil 40 via an ocular optical system 42, and $\Theta_2$ is an angle made between the visual axis 41 and a light ray emitted from a point 45, which is in point symmetry with the point 44 about the center 43 of the image display surface 8, and passing through the center of the observer's pupil 40, the value obtained from the angles $\Theta_1$ and $\Theta_2$, i.e.

$$|\tan \Theta_1 - \tan \Theta_2|/\tan \Theta_1$$

is 0.13 at the maximum. Thus, an extremely large asymmetric distortion is produced.

It is uncertain where the observer's pupil is placed in an exit pupil in which an image is observable. The observer's pupil does not always lie in the center of the exit pupil of the ocular optical system. If the observer's pupil is not placed in the center of the exit pupil, even if an asymmetric distortion is not produced by the ocular optical system, an asymmetric distortion may be observed because the observer's pupil is decentered with respect to the ocular optical system.

Particularly, in a case where images are displayed for both of observer's eyes, respectively, so that the observer can view a composite image with both his/her eyes, if the distance between the centers of the exit pupils of the left and right optical systems of the image display apparatus, that is, the interpupillary distance, is not coincident with the interpupillary distance of the observer, the centers of the exit pupils of the ocular optical systems and the observer's pupils are displaced relative to each other. In such a case, an asymmetric distortion is likely to occur.

If a large distortion, particularly a large asymmetric distortion, occurs, it is likely that the observer will be unable to view the correct image leading to a strong sense of incongruity.

There has also been developed an image display apparatus which provides a stereoscopic image by projecting images with a disparity therebetween into an observer's left and right eyes, respectively. In this case, however, if a distortion is produced by the ocular optical system, the disparity is likely to become different from the intended one owing to the distortion, causing the three-dimensional effect to be spoiled. Particularly, in a case where each ocular optical system produces a distortion which is asymmetric with respect to the center of the image field, and there is a difference in the distortion between the images projected into the observer's left and right eyes, the disparity is likely to deviate, causing the image to appear raised or depressed undesirably.

For example, even if, as shown in FIG. 23(*a*), two identical images are displayed on left and right image display devices, respectively, with the intention of making the observer perceive a plane surface, if the left and right optical systems produce distortions, each of which is asymmetric with respect to the center of the image field, and the images appear as shown for example in FIG. 23(*b*) to the observer, the observer perceives a concave surface rather than a plane surface.

There has heretofore been known neither an ocular optical system for an image display apparatus which is corrected for the above-described distortions, particularly a distortion which is asymmetric with respect to the center of the image field, nor an ocular optical system for an image display apparatus which is corrected for distortion that is asymmetric with respect to the center of the image field, which occurs when the observer's pupil is not placed in the center of the exit pupil of the ocular optical system.

SUMMARY OF THE INVENTION

In view of the above-described problems associated with the prior art, an object of the present invention is to provide an image display apparatus that is corrected for distortions, particularly, a distortion which is asymmetric with respect to the center of the image field.

To attain the above-described object, according to a first aspect of the present invention, there is provided an image display apparatus including an image display device, and an ocular optical system having a rotationally asymmetric optical surface or a decentered optical surface having a power. The image display apparatus satisfies the following condition:

$$|\tan \Theta_1 - \tan \Theta_2|/\tan \Theta_1 < 0.1 \tag{1}$$

where $\Theta_1$ is an angle made between a light ray emitted from an arbitrary point on the image display device and passing through the center of an exit pupil and a visual axis, that is, a straight line connecting the center of an observer's pupil and the center of a projected image of the image display device, and $\Theta_2$ is an angle made between the visual axis and a light ray emitted from a point which is in point symmetry with the arbitrary point about the center of the image display surface of the image display device and passing through the center of the exit pupil.

According to a second aspect of the present invention, there is provided an image display apparatus that has an image display device and an ocular optical system. The image display apparatus satisfies the following condition:

$$|\tan \Theta'_1 - \tan \Theta'_2|/\tan \Theta'_1 < 0.1 \tag{4}$$

where $\Theta'_1$ is an angle made between a light ray emitted from an arbitrary point on the image display device and passing through an arbitrary point in an exit pupil in which an image is observable, and a visual axis, that is, a straight line connecting the center of an observer's pupil and the center of a projected image of the image display device, and $\Theta'_2$ is an angle made between the visual axis and a light ray emitted from a point which is in point symmetry with the arbitrary point about the center of the image display surface of the image display device and passing through the arbitrary point in the exit pupil.

In these image display apparatuses, it is desirable for the ocular optical system to lead the image without forming an intermediate image.

The reason for adopting the above-described arrangements in the present invention, together with the functions thereof, will be explained below.

By adopting the arrangement according to the first aspect of the present invention, a distortion that is asymmetric with respect to the center of the image field, which is produced by the ocular optical system, can be reduced to such an extent that it gives no sense of incongruity to the observer. Further, even in a case where images with a disparity therebetween are projected into an observer's left and right eyes, respectively, to provide a stereoscopic image, it is possible for the observer to perceive the correct three-dimensional effect.

Regarding the angles $\Theta_1$ and $\Theta_2$, it is even more desirable to satisfy the following condition:

$$|\tan \Theta_1 - \tan \Theta_2|/\tan \Theta_1 < 0.05 \quad (2)$$

By satisfying the above condition, the asymmetric distortion can be further reduced.

It is still more desirable to satisfy the following condition:

$$|\tan \Theta_1 - \tan \Theta_2|/\tan \Theta_1 < 0.025 \quad (3)$$

By satisfying the above condition, the asymmetric distortion can be reduced still further.

By adopting the arrangement according to the second aspect of the present invention, a distortion that is asymmetric with respect to the center of the image field, which occurs when the observer's eyeball is displaced from the center of the exit pupil of the ocular optical system, can be reduced to such an extent that it gives no sense of incongruity to the observer. Particularly, in a case where images are displayed for both of observer's eye, respectively, so that the observer can view a composite image with both his/her eyes, even if the interpupillary distance of the observer is somewhat different from the interpupillary distance of the image display apparatus, there is no likelihood of a large asymmetric distortion occurring and making the observer feel incongruous.

Regarding the angles $\Theta'_1$ and $\Theta'_2$, it is even more desirable to satisfy the following condition:

$$|\tan \Theta'_1 - \tan \Theta'_2|/\tan \Theta'_1 < 0.05 \quad (5)$$

By satisfying the above condition, the asymmetric distortion can be further reduced.

It is still more desirable to satisfy the following condition:

$$|\tan \Theta'_1 - \tan \Theta'_2|/\tan \Theta'_1 < 0.025 \quad (6)$$

By satisfying the above condition, the asymmetric distortion can be still further reduced.

In the above-described image display apparatuses, it is preferable for the ocular optical system to be arranged to lead the image without forming an intermediate image. By adopting such an arrangement, it becomes unnecessary to provide a relay optical system, and it is therefore possible to realize an image display apparatus superior in portability.

It is also preferable that the ocular optical system should have a second surface which is a concave mirror provided to face the observer's eyeball at a tilt to the visual axis, and the ocular optical system should be arranged to lead the image without forming an intermediate image. With this arrangement, it becomes possible to fold the optical path in a compact form and hence possible to reduce the ocular optical system in both size and weight. Accordingly, it is possible to realize an image display apparatus that is superior in portability.

In this case, it is preferable to satisfy the following condition:

$$15° < \phi_0 < 40° \quad (7)$$

where $\phi_0$ is an angle made between a principal ray emitted from the center of the image display device and a line normal to the concave mirror at a point where the principal ray is incident on the concave mirror, that is, an incident angle made, as shown in FIG. 21, between a principal ray 60 emitted from the center 43 of the image display surface of an image display device 63 and a line 62 normal to a concave mirror 61 at a point where the principal ray 60 is incident on the concave mirror 61.

By satisfying the above condition, it is possible to minimize the distortion produced by the above-described concave mirror and, at the same time, to reduce the size and weight of the ocular optical system. Accordingly, it is possible to realize an image display apparatus that is superior in portability. It should be noted that the term "principal ray" as used herein means a light ray defined by the optical system and the observer's pupil position, and it is assumed that any light ray within an angle of 20° formed with a line normal to the image display device can be defined as a principal ray.

It is more desirable to satisfy the following condition:

$$20° < \phi_0 < 25° \quad (8)$$

By satisfying the above condition, it is possible to further minimize the distortion and reduce the size of the optical system.

It is even more desirable to satisfy the following condition:

$$21° < \phi_0 < 24° \quad (9)$$

By satisfying the above condition, it is possible to still further minimize the distortion and reduce the size of the optical system.

It is preferable that the ocular optical system should have a configuration symmetric with respect to a certain plane and satisfy the following condition:

$$|\phi_1 - \phi_2| < 15° \quad (10)$$

where $\phi_1$ and $\phi_2$ are angles made between, on the one hand, principal rays emitted from both ends of a section of the image display device taken along the plane of symmetry and, on the other, lines normal to the above-described concave mirror at respective points where the two principal rays are incident on the concave mirror, that is, incident angles made, as shown in FIG. 22, between, on the one hand, principal rays 60 emitted from both ends of a section of the image display device 63 taken along the plane of symmetry and, on the other, lines 62 normal to the concave mirror 61 at respective points where the principal rays 60 are incident on the concave mirror 61.

By satisfying the above condition, it is possible to minimize a distortion produced by the above-described second surface, which is asymmetric with respect to the decentering direction of the optical system.

It is even more desirable for the ocular optical system to satisfy the following condition:

$$|\phi_1-\phi_2|<5° \qquad (11)$$

By satisfying the above condition, the distortion that is asymmetric with respect to the decentering direction of the optical system can be further minimized.

It is still more desirable for the ocular optical system to satisfy the following condition:

$$|\phi_1/\phi_2|<2° \qquad (12)$$

By satisfying the above condition, the distortion that is asymmetric with respect to the decentering direction of the optical system can be reduced even more effectively.

It is preferable that the ocular optical system should have a configuration that is symmetric with respect to a certain plane and satisfy the following condition:

$$||\phi_1-\phi_0|-|\phi_2-\phi_0||<2° \qquad (13)$$

where $\phi_1$ and $\phi_2$ are incident angles made, as shown in FIG. 22, between, on the one hand, principal rays 60 emitted from both ends of a section of the image display device 63 taken along the plane of symmetry and, on the other, lines 62 normal to the concave mirror 61 at respective points where the principal rays 60 are incident on the concave mirror 61, and $\phi_0$ is an incident angle made between a principal ray 60 emitted from the center 43 of the image display device 63 and a line 62 normal to the concave mirror 61 at a point where the principal ray 60 is incident on the concave mirror 61.

By satisfying the above condition, it is possible to even more effectively minimize a distortion produced by the concave mirror, which is asymmetric with respect to the decentering direction of the optical system.

It is even more desirable for the ocular optical system to satisfy the following condition:

$$||\phi_1-\phi_0|-|\phi_2-\phi_0||<0.7° \qquad (14)$$

By satisfying the above condition, the asymmetric distortion can be further minimized.

It is still more desirable for the ocular optical system to satisfy the following condition:

$$||\phi_1-\phi_0|-|\phi_2-\phi_0||<0.35° \qquad (15)$$

By satisfying the above condition, the asymmetric distortion can be reduced even more effectively.

The ocular optical system may have at least three surfaces, i.e. a third surface provided to face the image display device, a second surface which is a concave mirror provided to face the observer's eyeball at a tilt to the visual axis, and a first surface provided between the second surface and the observer's eyeball, wherein light rays emitted from the image display device enter the ocular optical system through the third surface and are reflected by the first surface and then reflected by the second surface, and thereafter, the reflected light rays pass through the first surface to enter the observer's eyeball without forming an intermediate image. With this arrangement, it is possible to realize an image display apparatus which is capable of widening the field angle and providing excellent visibility.

In this case, if the third surface has a rotationally asymmetric surface configuration, a distortion asymmetric with respect to the tilt direction produced by the second surface, which is a tilted concave mirror, can be corrected by the asymmetric surface configuration of the third surface.

The third surface may have an asymmetric surface configuration in which the surface has a positive refracting power in the center thereof, and the positive refracting power weakens or changes to a negative refracting power as the distance from the center of the third surface increases toward the periphery thereof. With such an asymmetric surface configuration, it is possible to correct the distortion produced by the second surface, which is a concave mirror.

If the image display device is tilted with respect to the third surface, it becomes easy to correct a distortion that is asymmetric with respect to the tilt direction produced by the second surface, which is a tilted concave mirror.

The asymmetric distortion can be effectively corrected by tilting the image display device such that the distance between the third surface and the end of the image display device remote from the observer's eyeball is shorter than the distance between the third surface and the end of the image display device closer to the observer's eyeball.

If the ocular optical system is arranged such that the center of the surface configuration of the third surface is displaced toward the observer's eyeball, it becomes easy to correct distortion that is asymmetric with respect to the tilt direction produced by the second surface, which is a tilted concave mirror.

If the ocular optical system is arranged such that the center of the surface configuration of the first surface is displaced toward the image display device, it is possible to correct trapezoidal asymmetric distortion.

If the ocular optical system is arranged such that the center of the surface configuration of the first surface is not within the effective area, the trapezoidal asymmetric distortion can be corrected even more effectively.

The ocular optical system may be arranged such that the third surface has a positive refracting power for light rays transmitted therethrough; the first surface has a negative refracting power for light rays reflected thereby; the second surface has a positive refracting power for light rays reflected thereby; and the first surface has a negative refracting power for light rays transmitted therethrough. With this arrangement, it is possible to realize an ocular optical system corrected for asymmetric distortion and also favorably corrected for other aberrations.

Further, according to the present invention, the ocular optical system may have at least four surfaces, i.e. a third surface provided to face the image display device, a second surface which is a concave mirror provided to face the observer's eyeball at a tilt to the visual axis, a first surface provided between the second surface and the observer's eyeball, and a fourth surface which is a reflecting surface provided to face the second surface. Light rays emitted from the image display device enter the ocular optical system through the third surface and are reflected by the fourth surface and then reflected by the second surface, and thereafter, the reflected light rays pass through the first surface to enter the observer's eyeball without forming an intermediate image. With this arrangement, it is possible to realize an image display apparatus which is corrected for asymmetric distortion and capable of widening the field angle and providing excellent visibility.

Further, according to the present invention, the ocular optical system may have at least three surfaces, wherein light rays emitted from the image display device are reflected at least four times by the at least three surfaces to reach the observer's eyeball without forming an intermediate image, and wherein at least one of at least four reflecting surfaces is a concave mirror provided to face the observer's eyeball at a tilt to the visual axis. With this arrangement, it is possible to realize an image display apparatus which is corrected for asymmetric distortion and capable of widening the field angle and providing excellent visibility.

In this case, the ocular optical system may be arranged such that it includes, in order from the image display device side thereof, a first transmitting surface, a first reflecting surface, a second reflecting surface, a third reflecting surface, a fourth reflecting surface, and a second transmitting surface, and that the fourth reflecting surface is a concave mirror provided to face the observer's eyeball at a tilt to the visual axis. With this arrangement, it is possible to realize an image display apparatus which is corrected for asymmetric distortion and capable of further widening the field angle and providing excellent visibility.

The ocular optical system may be arranged such that the first transmitting surface and the second reflecting surface are disposed at the same position and with the same configuration, and the second transmitting surface, the first reflecting surface and the third reflecting surface are disposed at the same position and with the same configuration. With this arrangement, it is possible to realize an image display apparatus which is corrected for asymmetric distortion and capable of further widening the field angle and providing excellent visibility.

The ocular optical system may be arranged such that the first transmitting surface, the second reflecting surface and the second transmitting surface are disposed at the same position and with the same configuration, and the first reflecting surface and the third reflecting surface are disposed at the same position and with the same configuration. With this arrangement, it is possible to realize an image display apparatus which is corrected for asymmetric distortion and capable of further widening the field angle and providing excellent visibility.

Further, according to the present invention, the ocular optical system may have a semitransparent surface tilted with respect to the visual axis, and a concave mirror provided to face the observer's eyeball, wherein light rays emitted from the image display device are reflected by the semitransparent surface and then reflected by the concave mirror, and thereafter, the reflected light rays pass through the semitransparent surface to enter the observer's eyeball without forming an intermediate image. With this arrangement, it is possible to realize an image display apparatus which produces a minimal asymmetric distortion and provides excellent visibility even when the observer's pupil does not lie in the center of the exit pupil of the ocular optical system.

The ocular optical system may have a semitransparent surface tilted with respect to the visual axis, and a concave mirror provided to face the image display device, wherein light rays emitted from the image display device pass through the semitransparent surface and are reflected by the concave mirror and then reflected by the semitransparent surface to enter the observer's eyeball without forming an intermediate image. With this arrangement also, it is possible to realize an image display apparatus which produces a minimal asymmetric distortion and provides excellent visibility even when the observer's pupil does not lie in the center of the exit pupil of the ocular optical system.

In these cases, if the ocular optical system uses a beam splitter prism having a semitransparent surface, because the refractive index of the beam splitter prism is larger than 1, it is possible to realize an image display apparatus having a wider field angle.

Further, according to the present invention, the ocular optical system may have at least four surfaces, i.e. a third surface provided to face the image display device, a second surface which is a concave mirror provided to face the observer's eyeball at a tilt to the visual axis, a first surface provided between the second surface and the observer's eyeball, and a fifth surface which is a reflecting surface provided to face the first surface, wherein light rays emitted from the image display device enter the ocular optical system through the third surface and are reflected successively by the fifth surface, the first surface and the second surface, and thereafter, the reflected light rays pass through the first surface to enter the observer's eyeball without forming an intermediate image. With this arrangement, it is possible to realize an image display apparatus which is corrected for asymmetric distortion and which provides excellent visibility.

In the foregoing image display apparatuses according to the present invention, if the ocular optical system is arranged to lead an image to each of observer's left and right eyes, the image can be observed with both eyes, and this enables the observer to enjoy watching the image in an even more absorbed state. It should be noted that if there is a difference in distortion between images provided for observer's left and right eyes so as to be fused into a single image, the image as observed appears undesirably raised or depressed. Therefore, ocular optical systems with minimal distortion are demanded.

In addition, it is desirable for the foregoing image display apparatuses according to the present invention to have a support member that enables the image display apparatus to be fitted on the observer's head or face. Many of head- or face- mounted image display apparatuses, which can be fitted on the observer's head or face, use a rotationally asymmetric optical surface or a decentered optical surface having a power in an ocular optical system with a view to improving mountability. That is, they have the capability of being favorably fitted on the user's head or face. Moreover, a head- or face-mounted image display apparatus may be fitted such that the observer's pupil is undesirably decentered with respect to the ocular optical system. In such cases, an asymmetric distortion is likely to occur. Therefore, the use of the image display apparatus according to the present invention as a head- or face-mounted image display apparatus is even more effective.

It should be noted that the image display apparatus according to the present invention is particularly effective when the horizontal field angle is 30° or more.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Some examples of the optical system of the image display apparatus according to the present invention will be described below with reference to the accompanying drawings.

Figure 1:
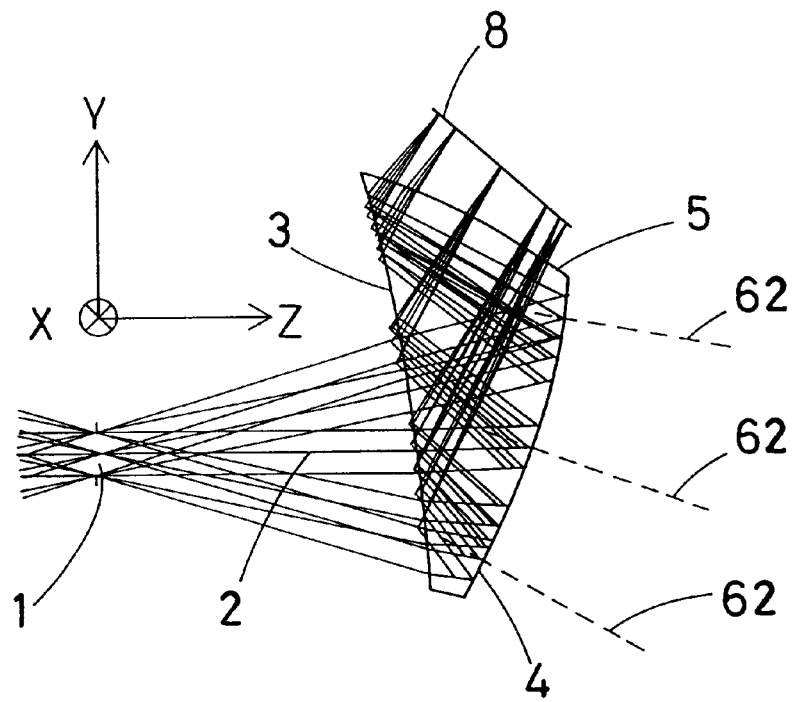
FIG. 1 is a sectional view of an ocular optical system according to Example 1 of the image display apparatus according to the present invention.

Constituent parameters of each example will be shown later. In the following description, the surface numbers (referred to as "surface No." in the tables) are shown as ordinal numbers in backward tracing from the exit pupil position 1 of the ocular optical system toward the image display surface 8 of the image display device. A coordinate system is defined as follows: As shown in FIG. 1, with the center of the exit pupil 1 of the ocular optical system defined as the origin, the observer's visual axis 2 is defined as a Z-axis. Regarding the sign of the Z-axis, the direction of the Z-axis away from the center of the pupil 1 is defined as a positive direction. A Y-axis is set perpendicular to the Z-axis in the plane of the figure. The upward direction (as viewed in the figure) of the Y-axis is defined as a positive direction. An X-axis is set orthogonal to both the Z- and Y-axes, i.e. perpendicular to the plane of the figure. It should be noted that the direction of the X-axis toward the reverse side of the figure from the obverse side thereof is defined as a positive direction.

In the constituent parameters (shown later), regarding each surface for which displacements (eccentricities) Y and Z and tilt angle $\Theta$ are shown in Examples 1 to 13 and 16, the displacement Y is a distance by which the vertex of the surface decenters in the Y-axis direction from the surface No. 1 (pupil position 1), which is a reference surface. The displacement Z is a distance by which the vertex of the surface decenters in the Z-axis direction from the surface No. 1. The tilt angle $\Theta$ is the angle of inclination of the central axis of the surface from the Z-axis. In this case, positive $\Theta$ means counterclockwise rotation. It should be noted that the surface separation is meaningless in these examples. In Examples 14 and 15, which are coaxial optical systems, the placement of each surface is determined by the surface separation between it and the subsequent surface. The sign of the surface separation is positive when light rays in the backward tracing exit from the pupil 1, and then the sign is inverted every time the light rays are reflected by a reflecting surface. In these examples, for a surface whose central axis is tilted with respect to the Z-axis, the tilt angle $\Theta$ from the Z-axis is also shown.

The non-rotationally symmetric aspherical configuration of each surface may be expressed in the coordinate system defining the surface as follows:

$$Z = [(X^2/R_x) + (Y^2/R_Y)]/[1 + \{1 - (1 + K_x)(X^2/R_x^2) -$$

$$(1 + K_y)(Y^2/R_y^2)\}^{1/2}] +$$

$$AR[(1 - AP)X^2 + (1 + AP)Y^2]^2 +$$

$$BR[(1 - BP)X^2 + (1 + BP)Y^2]^3 +$$

$$CR[(1 - CP)X^2 + (1 + CP)Y^2]^4 +$$

$$DR[(1 - DP)X^2 + (1 + DP)Y^2]^5$$

where $R_y$ is the paraxial curvature radius of the surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR, BR, CR and DR are 4th-, 6th-, 8th- and 10th-order aspherical coefficients, respectively, which are rotationally symmetric with respect to the Z-axis; and AP, BP, CP and DP are 4th-, 6th-, 8th- and 10th-order aspherical coefficients, respectively, which are rotationally asymmetric with respect to the Z-axis.

The rotationally symmetric aspherical configuration of each surface may be expressed in the coordinate system defining the surface as follows:

$$Z=[(h^2/R)/[1+\{1-(1+K)(h^2/R^2)\}^{1/2}]+Ah^4+Bh^6+Ch^8+Dh^{10}$$

where R is the paraxial curvature radius; K is the conical coefficient; A, B, C and D are 4th-, 6th-, 8th- and 10th-order aspherical coefficients, respectively; and h is given by $h^2=X^2+Y^2$.

In the coordinate system of each of the formulae that express surface configurations, the vertex of each surface is defined as an origin, and the center axis of each surface is defined as a Z-axis.

In constituent parameters (shown later), those which are not given any values are zero. The refractive index of a medium lying between surfaces is expressed by the refractive index for the spectral d-line (wavelength: 587.56 nanometers). Lengths are given in millimeters.

The sectional views of optical systems according to examples (described later) each show an optical system in a case where an observer's pupil lies in the center of the exit pupil 1 of the optical system.

In the following examples, the reciprocal of the position of a virtual image, that is, diopter, is 0 diopter [1/m] in Example 11, and −1 diopter [1/m] in the other examples.

[Example 1]

A sectional view of an ocular optical system according to this example is shown in FIG. 1. In this example, light rays emitted from an image display surface 8 of an image display device enter the optical system through a third surface 5 of the optical system and are reflected by a first surface 3 and then reflected by a second surface 4. Thereafter, the reflected light rays pass through the first surface 3 to enter an observer's eyeball placed in an exit pupil 1.

The diameter of the exit pupil of this optical system is 4 millimeters. When an image display device of 20.32 millimeters×15.24 millimeters (equivalent to a diagonal of 1 inch) is used in such a way that the long side extends in the X-axis direction:

the field angle in the X-axis direction is 41°

$|\tan \Theta_1-\tan \Theta_2|/\tan \Theta_1<0.054$ $\phi_0=20.94°$ $|\phi_1-\phi_2|=2.87°$ $||\phi_1-\phi_0|-|\phi_2-\phi_0||=0.14°$ Thus, the optical system is favorably corrected for asymmetric distortion. Therefore, it is possible to provide an image that gives no sense of incongruity to the observer.

[Example 2]

Figure 2:
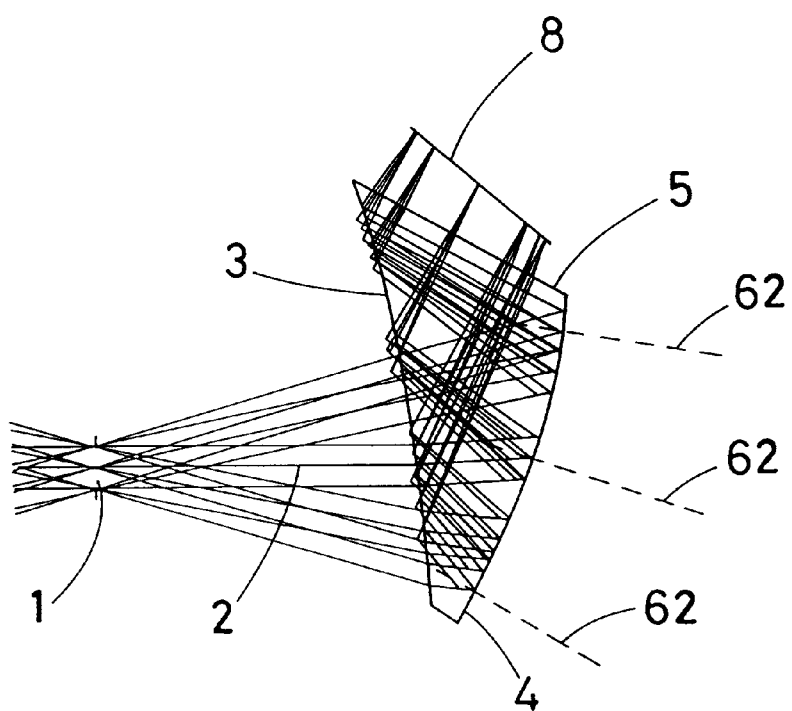
FIG. 2 is a sectional view of an ocular optical system according to Example 2 of the image display apparatus according to the present invention.

A sectional view of an ocular optical system according to this example is shown in FIG. 2. In this example, light rays emitted from an image display surface 8 of an image display device enter the optical system through a third surface 5 of the optical system and are reflected by a first surface 3 and then reflected by a second surface 4. Thereafter, the reflected light rays pass through the first surface 3 to enter an observer's eyeball placed in an exit pupil 1.

The diameter of the exit pupil of this optical system is 4 millimeters. When an image display device of 20.32 millimeters×15.24 millimeters (equivalent to a diagonal of 1 inch) is used in such a way that the long side extends in the X-axis direction:

the field angle in the X-axis direction is 42°

$|\tan \Theta_1-\tan \Theta_2|/\tan \Theta_1<0.016$ $\phi_0=21.14°$ $|\phi_1-\phi_2|=2.74°$ $||\phi_1-\phi_0|-|\phi_2-\phi_0||=0.20°$ Thus, the optical system is favorably corrected for asymmetric distortion. Therefore, it is possible to provide an image that gives no sense of incongruity to the observer.

[Example 3]

Figure 3:
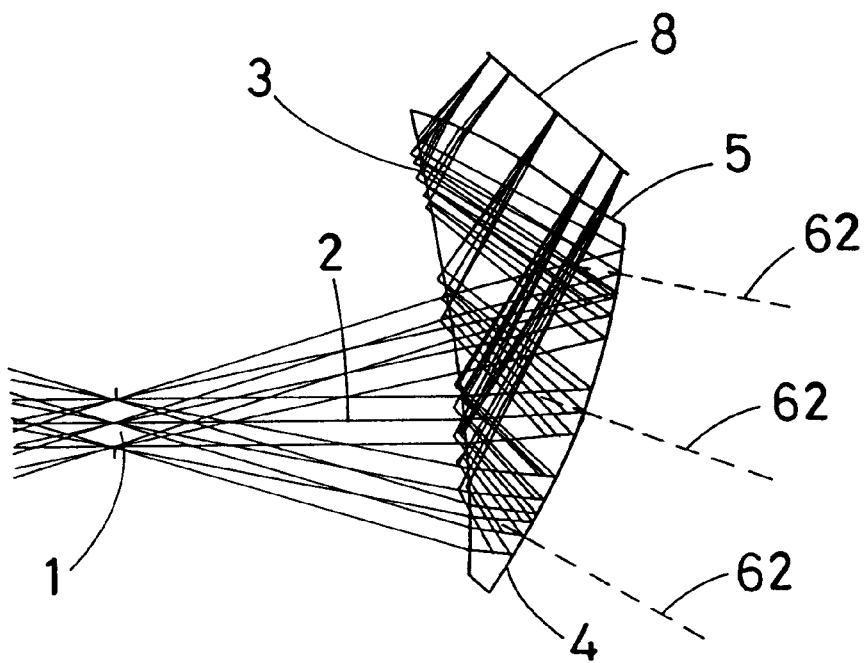
FIG. 3 is a sectional view of an ocular optical system according to Example 3 of the image display apparatus according to the present invention.

A sectional view of an ocular optical system according to this example is shown in FIG. 3. In this example, light rays emitted from an image display surface 8 of an image display device enter the optical system through a third surface 5 of the optical system and are reflected by a first surface 3 and then reflected by a second surface 4. Thereafter, the reflected light rays pass through the first surface 3 to enter an observer's eyeball placed in an exit pupil 1.

The diameter of the exit pupil of this optical system is 4 millimeters. When an image display device of 20.32 millimeters×15.24 millimeters (equivalent to a diagonal of 1 inch) is used in such a way that the long side extends in the X-axis direction:

the field angle in the X-axis direction is 43°

$|\tan \Theta_1-\tan \Theta_2|/\tan \Theta_1<0.030$ $\phi_0=22.22°$ $|\phi_1-\phi_2|=2.69°$ $||\phi_1-\phi_0|-|\phi_2-\phi_0||=1.44°$ Thus, the optical system is favorably corrected for asymmetric distortion. Therefore, it is possible to provide an image that gives no sense of incongruity to the observer.

[Example 4]

Figure 4:
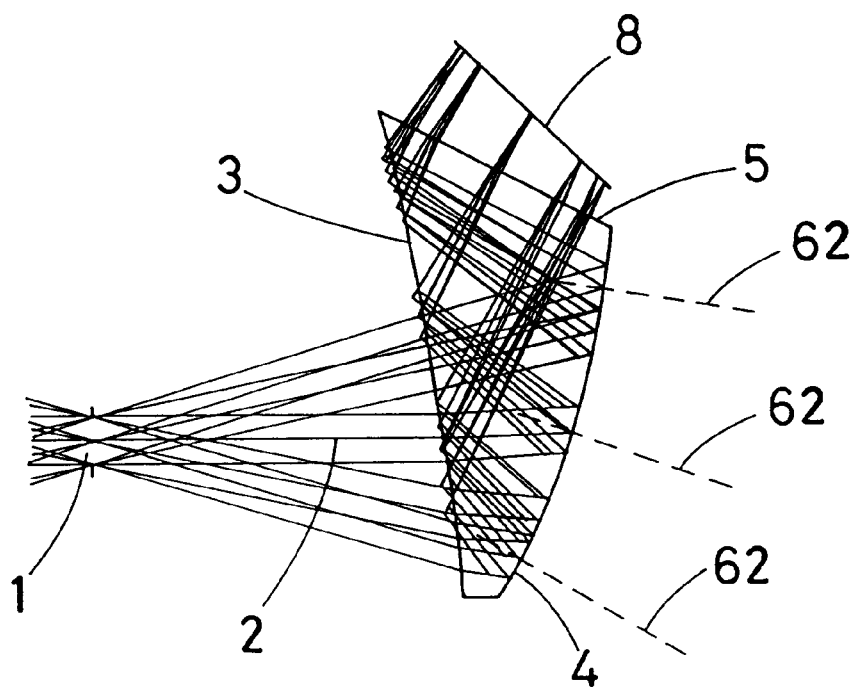
FIG. 4 is a sectional view of an ocular optical system according to Example 4 of the image display apparatus according to the present invention.

A sectional view of an ocular optical system according to this example is shown in FIG. 4. In this example, light rays emitted from an image display surface 8 of an image display device enter the optical system through a third surface 5 of the optical system and are reflected by a first surface 3 and then reflected by a second surface 4. Thereafter, the reflected light rays pass through the first surface 3 to enter an observer's eyeball placed in an exit pupil 1.

The diameter of the exit pupil of this optical system is 4 millimeters. When an image display device of 22.4 millimeters×16.8 millimeters (equivalent to a diagonal of 1.1 inches) is used in such a way that the long side extends in the X-axis direction:

the field angle in the X-axis direction is 44°

$|\tan \Theta_1-\tan \Theta_2|/\tan \Theta_1<0.010$ $\phi_0=20.92°$ $|\phi_1-\phi_2|=3.35°$ $||\phi_1-\phi_0|-|\phi_2-\phi_0||=0.29°$ When an image display device of wide vision size, i.e. 29.9 millimeters×16.8 millimeters (equivalent to a diagonal of 1.35 inches) is used in such a way that the long side extends in the X-axis direction:

the field angle in the X-axis direction is 59°

$|\tan \Theta_1 - \tan \Theta_2|/\tan \Theta_1 < 0.012$ $\phi_0 = 20.92°$ $|\phi_1 - \phi_2| = 3.35°$ $||\phi_1 - \phi_0| - |\phi_2 - \phi_0|| = 0.29°$ When an image display device of 12.6 millimeters×16.8 millimeters (equivalent to a diagonal of 0.83 inch) is used in such a way that the short side extends in the X-axis direction:

the field angle in the X-axis direction is 24°

$|\tan \Theta_1 - \tan \Theta_2|/\tan \Theta_1 < 0.010$ $\phi_0 = 20.92°$ $|\phi_1 - \phi_2| = 2.56°$ $||\phi_1 - \phi_0| - |\phi_2 - \phi_0|| = 0.16°$ Thus, the optical system is favorably corrected for asymmetric distortion. Therefore, it is possible to provide an image that gives no sense of incongruity to the observer.

It should be noted that this example is the same optical system as Example 1 of Japanese Patent Application No. 7-275775 filed by the present applicant, and that differences in constituent parameters are due to the difference in the way of defining the coordinate system.

[Example 5]

Figure 5:
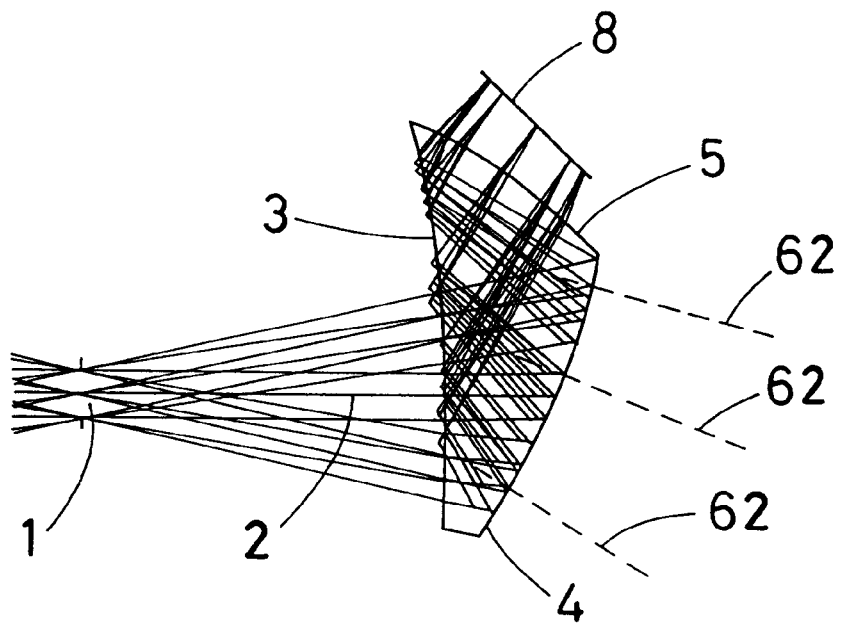
FIG. 5 is a sectional view of an ocular optical system according to Example 5 of the image display apparatus according to the present invention.

A sectional view of an ocular optical system according to this example is shown in FIG. 5. In this example, light rays emitted from an image display surface 8 of an image display device enter the optical system through a third surface 5 of the optical system and are reflected by a first surface 3 and then reflected by a second surface 4. Thereafter, the reflected light rays pass through the first surface 3 to enter an observer's eyeball placed in an exit pupil 1.

The diameter of the exit pupil of this optical system is 4 millimeters. When an image display device of 14.22 millimeters×10.67 millimeters (equivalent to a diagonal of 0.7 inch) is used in such a way that the long side extends in the X-axis direction:

the field angle in the X-axis direction is 34°

$|\tan \Theta_1 - \tan \Theta_2|/\tan \Theta_1 < 0.050$ $\phi_0 = 22.92°$ $|\phi_1 - \phi_2| = 0.21°$ $||\phi_1 - \phi_0| - |\phi_2 - \phi_0|| = 0.21°$ Thus, the optical system is favorably corrected for asymmetric distortion. Therefore, it is possible to provide an image that gives no sense of incongruity to the observer.

[Example 6]

Figure 6:
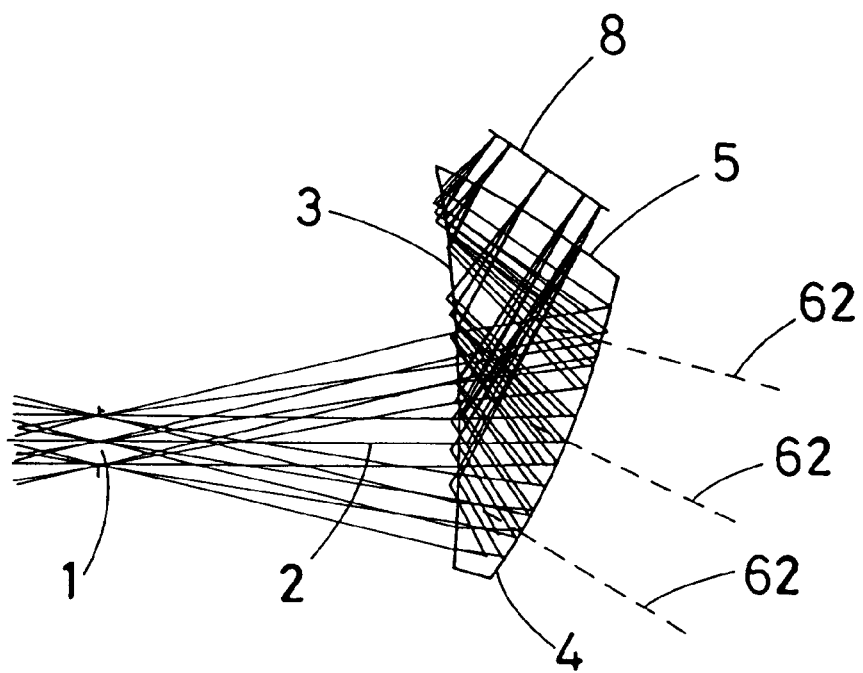
FIG. 6 is a sectional view of an ocular optical system according to Example 6 of the image display apparatus according to the present invention.

A sectional view of an ocular optical system according to this example is shown in FIG. 6. In this example, light rays emitted from an image display surface 8 of an image display device enter the optical system through a third surface 5 of the optical system and are reflected by a first surface 3 and then reflected by a second surface 4. Thereafter, the reflected light rays pass through the first surface 3 to enter an observer's eyeball placed in an exit pupil 1.

The diameter of the exit pupil of this optical system is 4 millimeters. When an image display device of 14.22 millimeters×10.67 millimeters (equivalent to a diagonal of 0.7 inch) is used in such a way that the long side extends in the X-axis direction:

the field angle in the X-axis direction is 35°

$|\tan \Theta_1 - \tan \Theta_2|/\tan \Theta_1 < 0.030$ $\phi_0 = 24.42°$ $|\phi_1 - \phi_2| = 0.24°$ $||\phi_1 - \phi_0| - |\phi_2 - \phi_0|| = 0.24°$ Thus, the optical system is favorably corrected for asymmetric distortion. Therefore, it is possible to provide an image that gives no sense of incongruity to the observer.

[Example 7]

Figure 7:
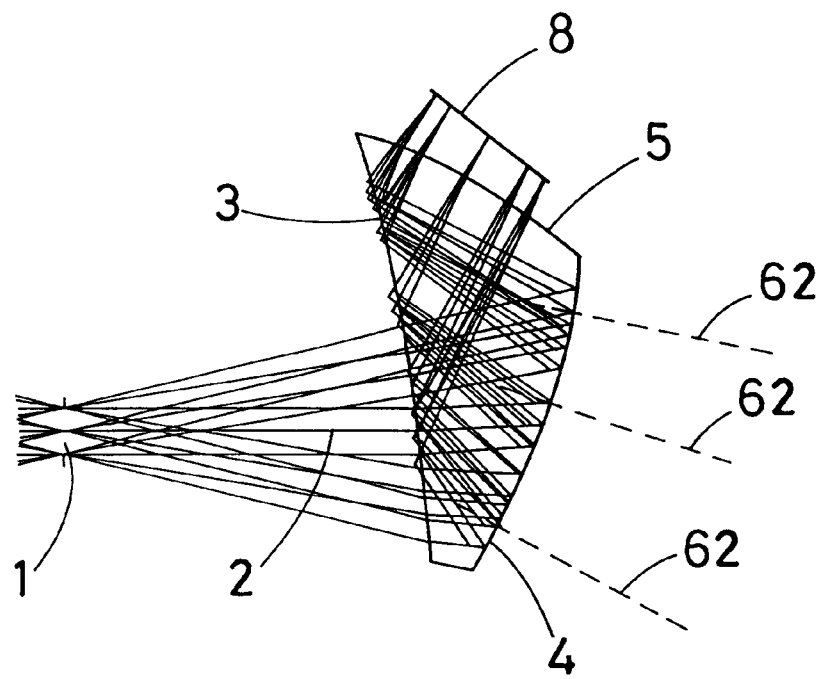
FIG. 7 is a sectional view of an ocular optical system according to Example 7 of the image display apparatus according to the present invention.

A sectional view of an ocular optical system according to this example is shown in FIG. 7. In this example, light rays emitted from an image display surface 8 of an image display device enter the optical system through a third surface 5 of the optical system and are reflected by a first surface 3 and then reflected by a second surface 4. Thereafter, the reflected light rays pass through the first surface 3 to enter an observer's eyeball placed in an exit pupil 1.

The diameter of the exit pupil of this optical system is 4 millimeters. When an image display device of 16.26 millimeters×12.19 millimeters (equivalent to a diagonal of 0.8 inch) is used in such a way that the long side extends in the X-axis direction:

the field angle in the X-axis direction is 35°

$|\tan \Theta_1 - \tan \Theta_2|/\tan \Theta_1 < 0.025$ $\phi_0 = 21.02°$ $|\phi_1 - \phi_2| = 0.86°$ $||\phi_1 - \phi_0| - |\phi_2 - \phi_0|| = 0.14°$ Thus, the optical system is favorably corrected for asymmetric distortion. Therefore, it is possible to provide an image that gives no sense of incongruity to the observer.

[Example 8]

Figure 8:
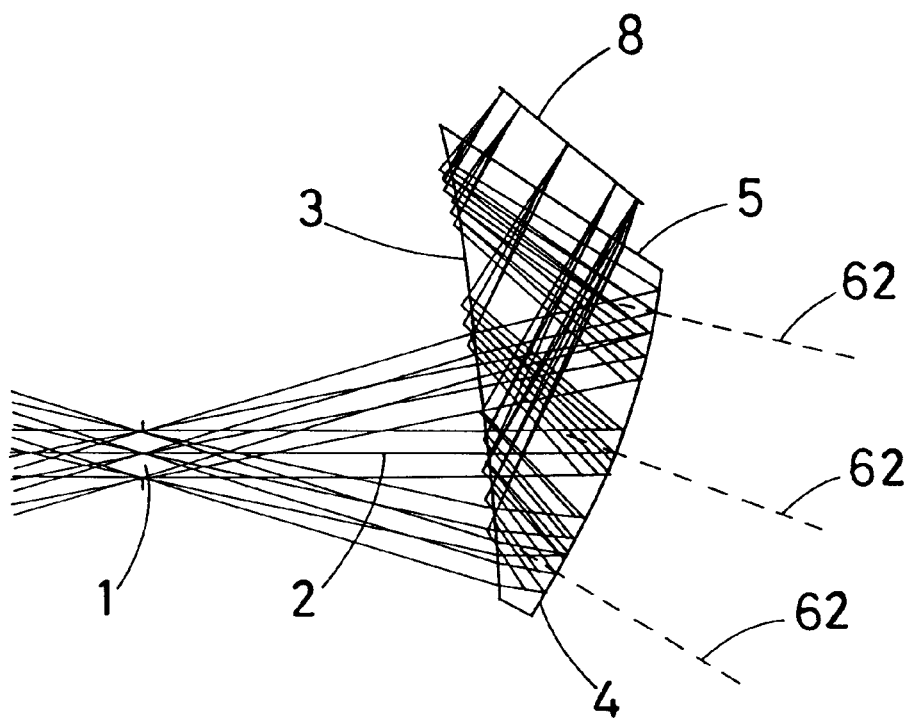
FIG. 8 is a sectional view of an ocular optical system according to Example 8 of the image display apparatus according to the present invention.

A sectional view of an ocular optical system according to this example is shown in FIG. 8. In this example, light rays emitted from an image display surface 8 of an image display device enter the optical system through a third surface 5 of the optical system and are reflected by a first surface 3 and then reflected by a second surface 4. Thereafter, the reflected light rays pass through the first surface 3 to enter an observer's eyeball placed in an exit pupil 1.

The diameter of the exit pupil of this optical system is 4 millimeters. When an image display device of 20.32 millimeters×15.24 millimeters (equivalent to a diagonal of 1 inch) is used in such a way that the long side extends in the X-axis direction:

the field angle in the X-axis direction is 43°

$|\tan \Theta_1 - \tan \Theta_2|/\tan \Theta_1 < 0.023$ $\phi_0=22.70°$ $|\phi_1-\phi_2|=3.12°$ $||\phi_1-\phi_0|-|\phi_2-\phi_0||=0.75°$ Thus, the optical system is favorably corrected for asymmetric distortion. Therefore, it is possible to provide an image that gives no sense of incongruity to the observer.

[Example 9]

Figure 9:
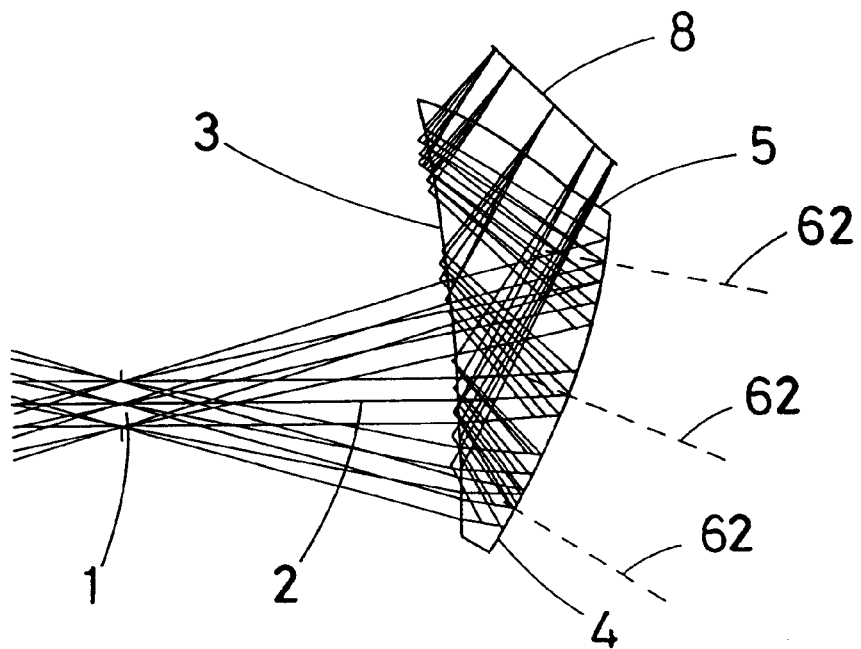
FIG. 9 is a sectional view of an ocular optical system according to Example 9 of the image display apparatus according to the present invention.

A sectional view of an ocular optical system according to this example is shown in FIG. 9. In this example, light rays emitted from an image display surface 8 of an image display device enter the optical system through a third surface 5 of the optical system and are reflected by a first surface 3 and then reflected by a second surface 4. Thereafter, the reflected light rays pass through the first surface 3 to enter an observer's eyeball placed in an exit pupil 1.

The diameter of the exit pupil of this optical system is 4 millimeters. When an image display device of 20.32 millimeters×15.24 millimeters (equivalent to a diagonal of 1 inch) is used in such a way that the long side extends in the X-axis direction:

the field angle in the X-axis direction is 43°

$|\tan\Theta_1-\tan\Theta_2|/\tan\Theta_1<0.009$ $\phi_0=22.99°$ $|\phi_1-\phi_2|=3.21°$ $||\phi_1-\phi_0|-|\phi_2-\phi_0||=1.76°$ Thus, the optical system is favorably corrected for asymmetric distortion. Therefore, it is possible to provide an image that gives no sense of incongruity to the observer.

[Example 10]

Figure 10:
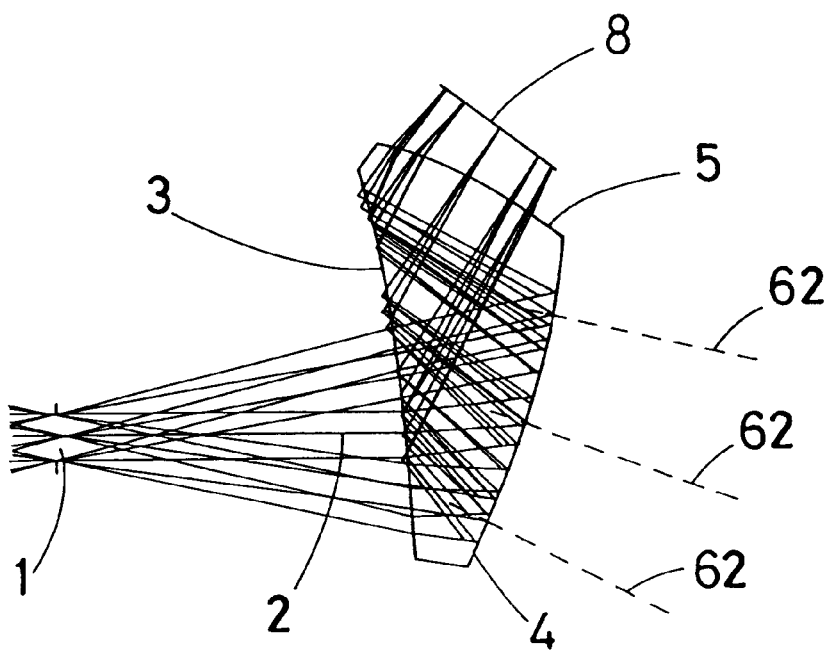
FIG. 10 is a sectional view of an ocular optical system according to Example 10 of the image display apparatus according to the present invention.

A sectional view of an ocular optical system according to this example is shown in FIG. 10. In this example, light rays emitted from an image display surface 8 of an image display device enter the optical system through a third surface 5 of the optical system and are reflected by a first surface 3 and then reflected by a second surface 4. Thereafter, the reflected light rays pass through the first surface 3 to enter an observer's eyeball placed in an exit pupil 1.

The diameter of the exit pupil of this optical system is 4 millimeters. When an image display device of 16.26 millimeters×12.19 millimeters (equivalent to a diagonal of 0.8 inch) is used in such a way that the long side extends in the X-axis direction:

the field angle in the X-axis direction is 35°

$|\tan\Theta_1-\tan\Theta_2|/\tan\Theta_1<0.016$ $\phi_0=21.09°$ $|\phi_1-\phi_2|=1.84°$ $||\phi_1-\phi_0|-|\phi_2-\phi_0||=0.28°$ Thus, the optical system is favorably corrected for asymmetric distortion. Therefore, it is possible to provide an image that gives no sense of incongruity to the observer.

[Example 11]

Figure 11:
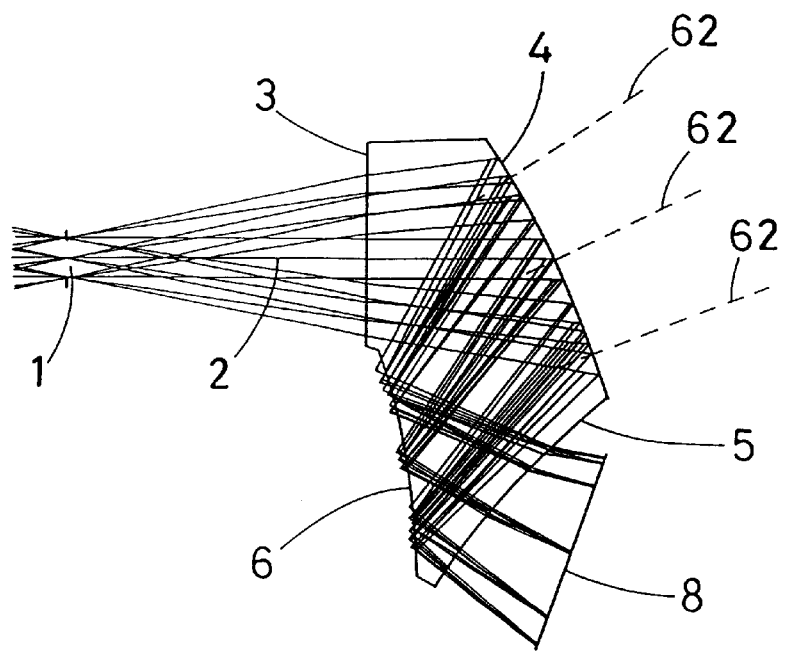
FIG. 11 is a sectional view of an ocular optical system according to Example 11 of the image display apparatus according to the present invention.

A sectional view of an ocular optical system according to this example is shown in FIG. 11. In this example, light rays emitted from an image display surface 8 of an image display device enter the optical system through a third surface 5 of the optical system and are reflected by a fourth surface 6 and then reflected by a second surface 4. Thereafter, the reflected light rays pass through a first surface 3 to enter an observer's eyeball placed in an exit pupil 1.

The diameter of the exit pupil of this optical system is 4 millimeters. When an image display device of 22.4 millimeters×16.8 millimeters (equivalent to a diagonal of 1.1 inches) is used in such a way that the long side extends in the X-axis direction:

the field angle in the X-axis direction is 27°

$|\tan\Theta_1-\tan\Theta_2|/\tan\Theta_1<0.012$ $\phi_0=26.59°$ $|\phi_1-\phi_2|=1.72°$ $||\phi_1-\phi_0|-|\phi_2-\phi_0||=0.37°$ Thus, the optical system is favorably corrected for asymmetric distortion. Therefore, it is possible to provide an image that gives no sense of incongruity to the observer.

It should be noted that this example is the same optical system as Example 4 of Japanese Patent Application No. 7-127896 filed by the present applicant, and that differences in constituent parameters are due to the difference in the way of defining the coordinate system.

[Example 12]

Figure 12:
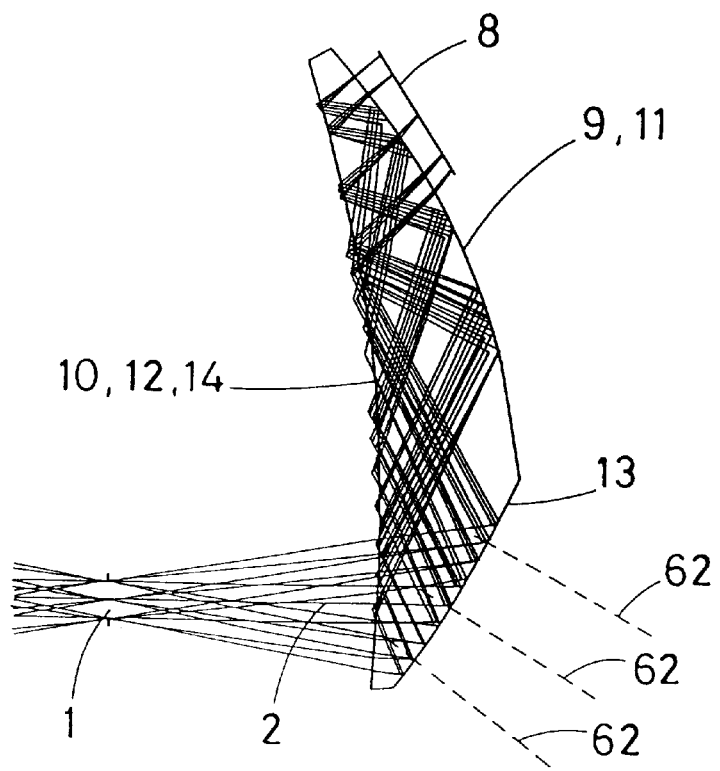
FIG. 12 is a sectional view of an ocular optical system according to Example 12 of the image display apparatus according to the present invention.

A sectional view of an ocular optical system according to this example is shown in FIG. 12. In this example, light rays emitted from an image display surface 8 of an image display device enter the optical system through a first transmitting surface 9 and are reflected successively by a first reflecting surface 10, a second reflecting surface 11, a third reflecting surface 12 and a fourth reflecting surface 13. Thereafter, the reflected light rays pass through a second transmitting surface 14 to enter an observer's eyeball placed in an exit pupil 1.

It should be noted that the first transmitting surface 9 and the second reflecting surface 11 are disposed at the same position and with the same configuration, and the first reflecting surface 10, the third reflecting surface 12 and the second transmitting surface 14 are disposed at the same position and with the same configuration.

The diameter of the exit pupil of this optical system is 4 millimeters. When an image display device of 20.32 millimeters×15.24 millimeters (equivalent to a diagonal of 1 inch) is used in such a way that the long side extends in the X-axis direction:

the field angle in the X-axis direction is 27°

$|\tan\Theta_1-\tan\Theta_2|/\tan\Theta_1<0.045$ $\phi_0=31.77°$ $|\phi_1-\phi_2|=6.47°$ $||\phi_1-\phi_0|-|\phi_2-\phi_0||=0.14°$ Thus, the optical system is favorably corrected for asymmetric distortion. Therefore, it is possible to provide an image that gives no sense of incongruity to the observer.

[Example 13]

Figure 13:
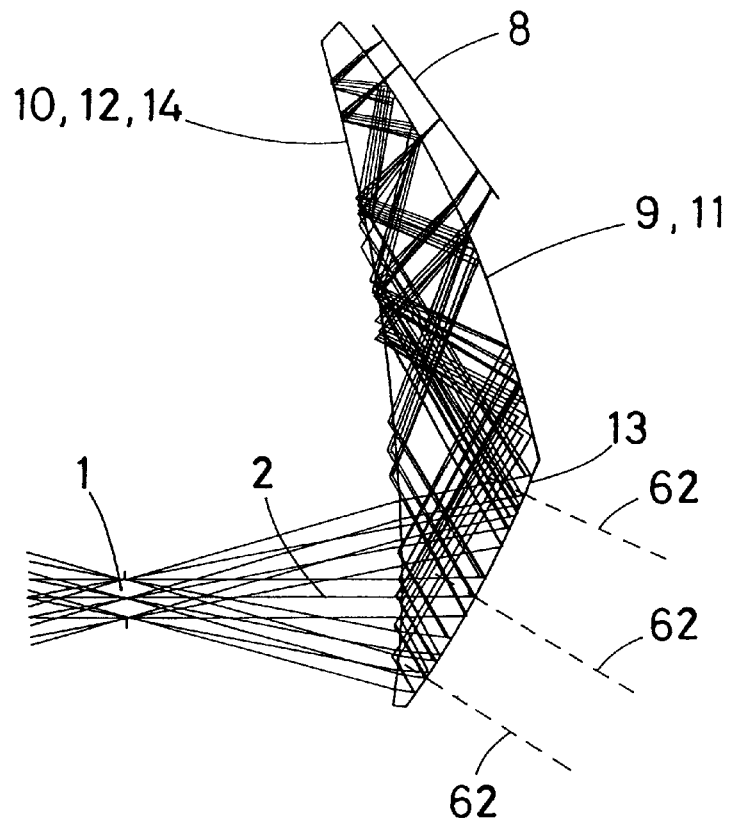
FIG. 13 is a sectional view of an ocular optical system according to Example 13 of the image display apparatus according to the present invention.

A sectional view of an ocular optical system according to this example is shown in FIG. 13. In this example, light rays emitted from an image display surface 8 of an image display device enter the optical system through a first transmitting surface 9 and are reflected successively by a first reflecting surface 10, a second reflecting surface 11, a third reflecting surface 12 and a fourth reflecting surface 13. Thereafter, the reflected light rays pass through a second transmitting surface 14 to enter an observer's eyeball placed in an exit pupil 1.

It should be noted that the first transmitting surface 9 and the second reflecting surface 11 are disposed at the same position and with the same configuration, and the first reflecting surface 10, the third reflecting surface 12 and the second transmitting surface 14 are disposed at the same position and with the same configuration.

The diameter of the exit pupil of this optical system is 4 millimeters. When an image display device of 15.24 millimeters×20.32 millimeters (equivalent to a diagonal of 1 inch) is used in such a way that the short side extends in the X-axis direction:

the field angle in the X-axis direction is 23°

$|\tan \Theta_1 - \tan \Theta_2|/\tan \Theta_1 < 0.058$ $\phi_0 = 29.92°$ $|\phi_1 - \phi_2| = 6.00°$ $||_1 - \phi_0| - |\phi_2 - \phi_0|| = 0.23°$ Thus, the optical system is favorably corrected for asymmetric distortion. Therefore, it is possible to provide an image that gives no sense of incongruity to the observer.

[Example 14]

Figure 14:
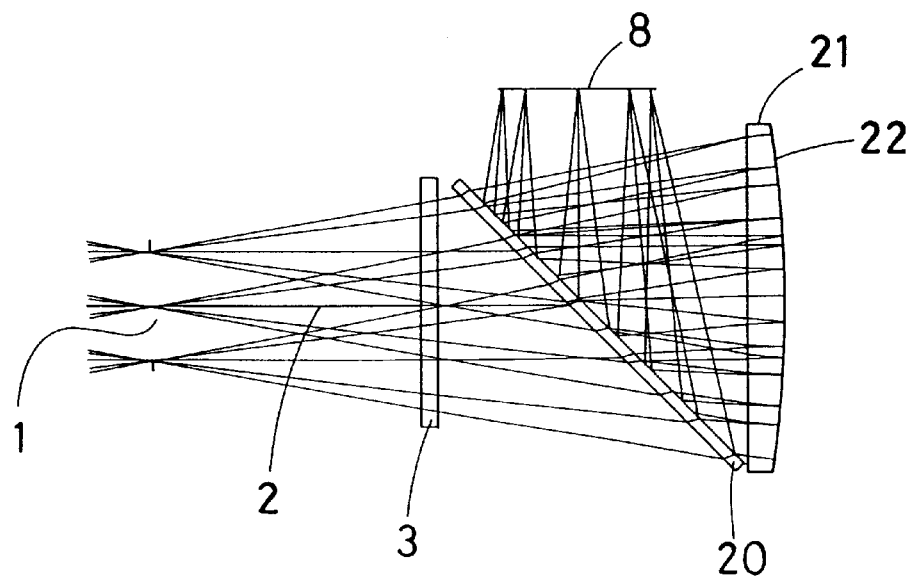
FIG. 14 is a sectional view of an ocular optical system according to Example 14 of the image display apparatus according to the present invention.

A sectional view of an ocular optical system according to this example is shown in FIG. 14. In this example, light rays emitted from an image display surface 8 of an image display device are reflected by a half-mirror 20 having a semitransparent surface to enter a back-coated mirror 21 and then reflected by a reflecting surface 22 of the back-coated mirror 21. Thereafter, the reflected light rays are incident on the half-mirror 20 and pass through the semitransparent surface of the half-mirror 20 and further pass through a cover glass 3 to enter an observer's eyeball placed in an exit pupil 1.

The diameter of the exit pupil of this optical system is 12 millimeters. When an image display device of 22.4 millimeters×16.8 millimeters (equivalent to a diagonal of 1.1 inches) is used in such a way that the long side extends in the X-axis direction, and the observer's pupil is decentered by 6 millimeters in the X-axis direction with respect to the optical system:

the field angle in the X-axis direction is 27°

$|\tan \Theta'_1 - \tan \Theta'_2|/\tan \Theta'_1 < 0.002$

When an image display device of 29.9 millimeters×16.8 millimeters (equivalent to a diagonal of 1.35 inches) is used in such a way that the long side extends in the X-axis direction, and the observer's pupil is decentered by 6 millimeters in the X-axis direction with respect to the optical system:

the field angle in the X-axis direction is 37°

$|\tan \Theta'_1 - \tan \Theta'_2|/\tan \Theta'_1 < 0.002$

Thus, even when the observer's pupil does not lie in the center of the exit pupil 1 of the ocular optical system, asymmetric distortion is favorably corrected. Therefore, it is possible to provide an image that gives no sense of incongruity to the observer.

It should be noted that this example is the same optical system as Example 8 of Japanese Patent Application No. 7-247736 filed by the present applicant. However, in Japanese Patent Application No. 7-247736, the half-mirror is treated as an optical member whose thickness is ignorable, and the thickness of the half-mirror is regarded as zero, whereas, in this example, it is treated as an optical member having a thickness. Differences in the other constituent parameters are due to the difference in the way of defining the coordinate system.

[Example 15]

Figure 15:
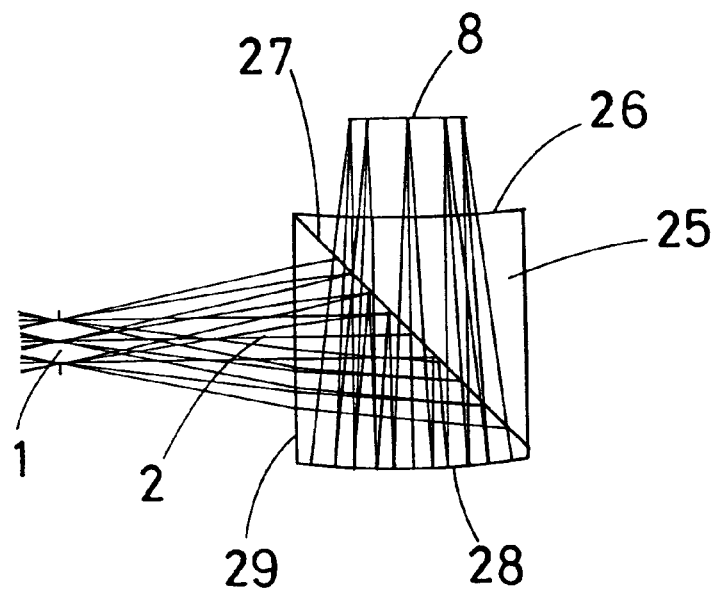
FIG. 15 is a sectional view of an ocular optical system according to Example 15 of the image display apparatus according to the present invention.

A sectional view of an ocular optical system according to this example is shown in FIG. 15. The optical system according to this example consists essentially of a beam splitter prism 25 having a semitransparent surface 27. Light rays emitted from an image display surface 8 of an image display device enter the beam splitter prism 25 through an entrance surface 26 thereof. The incident light rays pass through the semitransparent surface 27 and are reflected by a concave mirror 28 provided to face the image display surface 8 across the surfaces 26 and 27. Thereafter, the reflected light rays are reflected by the semitransparent surface 27 and pass through an exit surface 29 to enter an observer's eyeball placed in an exit pupil 1.

The diameter of the exit pupil of this optical system is 4 millimeters. When an image display device of 10.16 millimeters×7.62 millimeters (equivalent to a diagonal of 0.5 inch) is used in such a way that the long side extends in the X-axis direction, and the observer's pupil is decentered by 2 millimeters in the X-axis direction with respect to the optical system:

the field angle in the X-axis direction is 22°

$|\tan \Theta'_1 - \tan \Theta'_2|/\tan \Theta'_1 < 0.029$

When an image display device of 22.4 millimeters×16.8 millimeters (equivalent to a diagonal of 1.1 inches) is used in such a way that the long side extends in the X-axis direction, and the observer's pupil is decentered by 2 millimeters in the X-axis direction with respect to the optical system:

the field angle in the X-axis direction is 46°

$|\tan \Theta'_1 - \tan \Theta'_2|/\tan \Theta'_1 < 0.038$

When an image display device of 29.9 millimeters×16.8 millimeters (equivalent to a diagonal of 1.35 inches) is used in such a way that the long side extends in the X-axis direction, and the observer's pupil is decentered by 2 millimeters in the X-axis direction with respect to the optical system:

the field angle in the X-axis direction is 60°

$|\tan \Theta'_1 - \tan \Theta'_2|/\tan \Theta'_1 < 0.039$

When an image display device of 12.6 millimeters×16.8 millimeters (equivalent to a diagonal of 0.83 inch) is used in such a way that the long side extends in the X-axis direction, and the observer's pupil is decentered by 2 millimeters in the X-axis direction with respect to the optical system:

the field angle in the X-axis direction is 27°

$|\tan \Theta'_1 - \tan \Theta'_2|/\tan \Theta'_1 < 0.033$

Thus, the optical system is favorably corrected for asymmetric distortion. Therefore, it is possible to provide an image that gives no sense of incongruity to the observer.

It should be noted that this example is the same optical system as Example 1 of Japanese Patent Application No. 7-268485 filed by the present applicant.

[Example 16]

Figure 16:
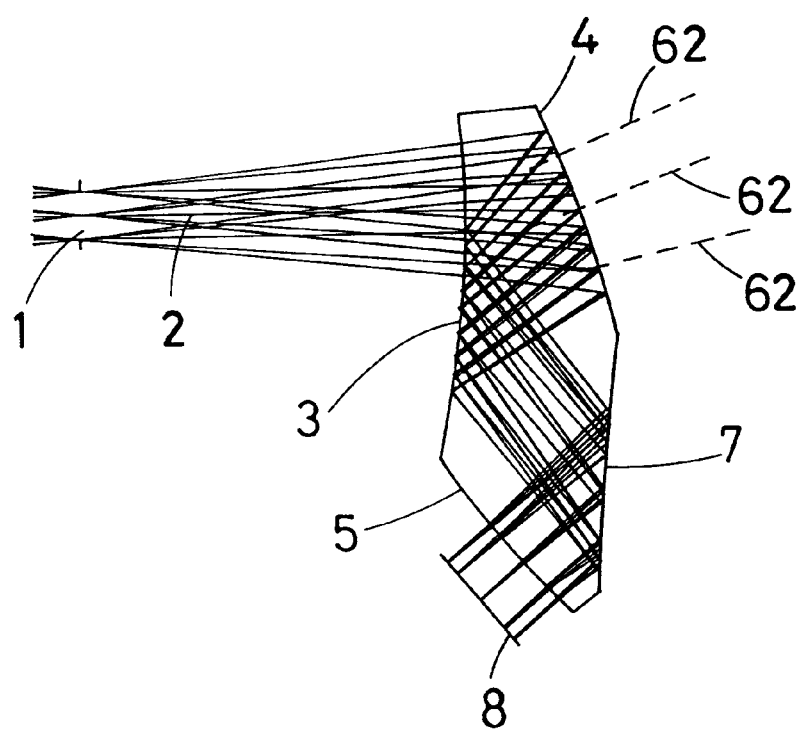
FIG. 16 is a sectional view of an ocular optical system according to Example 16 of the image display apparatus according to the present invention.

A sectional view of an ocular optical system according to this example is shown in FIG. 16. In this example, light rays emitted from an image display surface 8 of an image display device enter the optical system through a third surface 5 of the optical system and are reflected successively by a fifth surface 7, a first surface 3 and a second surface 4. Thereafter, the reflected light rays pass through the first surface 3 to enter an observer's eyeball placed in an exit pupil 1.

The diameter of the exit pupil of this optical system is 4 millimeters. When an image display device of 12.19 millimeters×9.14 millimeters (equivalent to a diagonal of 0.6 inch) is used in such a way that the long side extends in the X-axis direction:

the field angle in the X-axis direction is 17.7°

$$|\tan \Theta_1 - \tan \Theta_2|/\tan \Theta_1 < 0.006$$

$$\phi_0 = 20.18°$$

$$|\phi_1 - \phi_2| = 0.82°$$

$$||\phi_1 - \phi_0| - |\phi_2 - \phi_0|| = 0.1128°$$

Thus, the optical system is favorably corrected for asymmetric distortion. Therefore, it is possible to provide an image that gives no sense of incongruity to the observer.

The values of constituent parameters in backward ray tracing of the above-described Examples 1 to 16 are as follows:

| Surface No. | Radius of curvature | Surface separation | Refractive index (Displacement) | Abbe's No. (Tilt angle) |
|---|---|---|---|---|
| Example 1 | | | | |
| 1 | ∞(pupil) | | | |
| 2 | $R_y$ −144.911 | | 1.4922 | 57.50 |
| | $R_x$ −85.437 | Y 26.974 | θ 15.66° | |
| | $K_y$ 0 | Z 25.864 | | |
| | $K_x$ 0 | | | |
| | AR 9.5125 × $10^{-7}$ | | | |
| | BR 6.3758 × $10^{-17}$ | | | |
| | CR −1.8631 × $10^{-14}$ | | | |
| | DR −1.6949 × $10^{-16}$ | | | |
| | AP −2.7942 × $10^{-1}$ | | | |
| | BP −2.8211 × $10^{1}$ | | | |
| | CP −2.2256 × $10^{-2}$ | | | |
| | DP −6.9585 × $10^{-1}$ | | | |
| 3 | $R_y$ −68.405 | | 1.4922 | 57.50 |
| | $R_x$ −57.087 | Y −0.236 | θ −19.25° | |
| | $K_y$ 0 | Z 41.899 | | |
| | $K_x$ 0 | | | |
| | AR 1.1808 × $10^{-7}$ | | | |
| | BR −1.7923 × $10^{-12}$ | | | |
| | CR 4.2281 × $10^{-19}$ | | | |
| | DR −2.0037 × $10^{-16}$ | | | |
| | AP 3.3816 × $10^{-1}$ | | | |
| | BP −6.0490 | | | |
| | CP 4.5634 × $10^{1}$ | | | |
| | DP 1.0710 | | | |
| 4 | $R_y$ −144.911 | | 1.4922 | 57.50 |
| | $R_x$ −85.437 | Y 26.974 | θ 15.66° | |
| | $K_y$ 0 | Z 25.864 | | |
| | $K_x$ 0 | | | |
| | AR 9.5125 × $10^{-7}$ | | | |
| | BR 6.3758 × $10^{-17}$ | | | |
| | CR −1.8631 × $10^{-14}$ | | | |
| | DR −1.6949 × $10^{-16}$ | | | |
| | AP −2.7942 × $10^{-1}$ | | | |
| | BP −2.8211 × $10^{1}$ | | | |
| | CP −2.2256 × $10^{-2}$ | | | |
| | DP −6.9585 × $10^{-1}$ | | | |
| 5 | $R_y$ −43.442 | | Y 24.579 | θ 67.57° |
| | $R_x$ −72.631 | | Z 31.691 | |
| | $K_y$ 0 | | | |
| | $K_x$ 0 | | | |
| | AR 3.2476 × $10^{-5}$ | | | |
| | BR −5.5452 × $10^{-8}$ | | | |
| | AP −2.8736 × $10^{-1}$ | | | |
| | BP −3.5632 × $10^{-1}$ | | | |
| 6 | ∞(image display plane) | | Y 26.846 | θ 48.91° |
| | | | Z 39.147 | |
| Example 2 | | | | |
| 1 | ∞(pupil) | | | |
| 2 | $R_y$ −164.733 | | 1.4922 | 57.50 |
| | $R_x$ −81.002 | Y 29.232 | θ 16.48° | |
| | $K_y$ 0 | Z 24.862 | | |
| | $K_x$ 0 | | | |
| | AR 8.4594 × $10^{-7}$ | | | |
| | BR 2.1617 × $10^{-16}$ | | | |
| | CR −1.5548 × $10^{-14}$ | | | |
| | DR −5.6745 × $10^{-17}$ | | | |
| | AP −2.9852 × $10^{-1}$ | | | |
| | BP −4.9005 × $10^{1}$ | | | |
| | CP −1.9340 × $10^{-1}$ | | | |
| | DP −5.4767 × $10^{-1}$ | | | |
| 3 | $R_y$ −69.839 | | 1.4922 | 57.50 |
| | $R_x$ −56.499 | Y −1.143 | θ −19.87° | |
| | $K_y$ 0 | Z 41.833 | | |
| | $K_x$ 0 | | | |
| | AR −5.4967 × $10^{-8}$ | | | |
| | BR −3.6712 × $10^{-13}$ | | | |
| | CR 4.9478 × $10^{-19}$ | | | |
| | DR −4.5884 × $10^{-17}$ | | | |
| | AP 7.3462 × $10^{-1}$ | | | |
| | BP −1.1634 × $10^{1}$ | | | |
| | CP 4.5785 × $10^{1}$ | | | |
| | DP 1.8752 | | | |
| 4 | $R_y$ −164.733 | | 1.4922 | 57.50 |
| | $R_x$ −81.002 | Y 29.232 | θ 16.48° | |
| | $K_y$ 0 | Z 24.862 | | |
| | $K_x$ 0 | | | |
| | AR 8.4594 × $10^{-7}$ | | | |
| | BR 2.1617 × $10^{-16}$ | | | |
| | CR −1.5548 × $10^{-14}$ | | | |
| | DR −5.6745 × $10^{-17}$ | | | |
| | AP −2.9852 × $10^{-1}$ | | | |
| | BP −4.9005 × $10^{1}$ | | | |
| | CP −1.9340 × $10^{-1}$ | | | |
| | DP −5.4767 × $10^{-1}$ | | | |
| 5 | ∞ | | Y 24.245 | θ 59.92° |
| | | | Z 30.959 | |
| 6 | ∞(image display plane) | | Y 26.739 | θ 49.90° |
| | | | Z 37.480 | |
| Example 3 | | | | |
| 1 | ∞(pupil) | | | |
| 2 | $R_y$ −87.875 | | 1.4922 | 57.50 |
| | $R_x$ −62.782 | Y 34.677 | θ 19.80° | |
| | $K_y$ 0 | Z 24.473 | | |
| | $K_x$ 0 | | | |
| | AR 2.4227 × $10^{-6}$ | | | |
| | BR 1.7540 × $10^{-15}$ | | | |
| | CR −5.4614 × $10^{-14}$ | | | |
| | DR −7.9916 × $10^{-16}$ | | | |
| | AP −3.8680 × $10^{-1}$ | | | |
| | BP 5.4664 × $10^{1}$ | | | |
| | CP 2.4096 × $10^{-1}$ | | | |
| | DP −6.7338 × $10^{-1}$ | | | |
| 3 | $R_y$ −66.126 | | 1.4922 | 57.50 |
| | $R_x$ −53.946 | Y 8.450 | θ −13.08° | |
| | $K_y$ 0 | Z 44.116 | | |

-continued

| Surface No. | Radius of curvature | Surface separation | Refractive index (Displacement) | Abbe's No. (Tilt angle) |
|---|---|---|---|---|
| | $K_x$ 0 | | | |
| | AR $1.2553 \times 10^{-9}$ | | | |
| | BR $-4.0864 \times 10^{-12}$ | | | |
| | CR $-5.9211 \times 10^{-19}$ | | | |
| | DR $-1.8360 \times 10^{-15}$ | | | |
| | AP $-2.1956 \times 10^{1}$ | | | |
| | BP $-4.7195$ | | | |
| | CP $-2.3966 \times 10^{1}$ | | | |
| | DP $9.4646 \times 10^{-2}$ | | | |
| 4 | $R_y$ $-87.875$ | | 1.4922 | 57.50 |
| | $R_x$ $-62.782$ | Y 34.677 | θ 19.80° | |
| | $K_y$ 0 | Z 24.473 | | |
| | $K_x$ 0 | | | |
| | AR $2.4227 \times 10^{-6}$ | | | |
| | BR $1.7540 \times 10^{-15}$ | | | |
| | CR $-5.4614 \times 10^{-14}$ | | | |
| | DR $-7.9916 \times 10^{-16}$ | | | |
| | AP $-3.8680 \times 10^{-1}$ | | | |
| | BP $5.4664 \times 10^{1}$ | | | |
| | CP $2.4096 \times 10^{-1}$ | | | |
| | DP $-6.7338 \times 10^{-1}$ | | | |
| 5 | $R_y$ $-34.055$ | Y 23.899 | θ 63.91° | |
| | $R_x$ $-23.924$ | Z 33.467 | | |
| | $K_y$ 0 | | | |
| | $K_x$ 0 | | | |
| | AR $9.7301 \times 10^{-5}$ | | | |
| | BR $-1.5348 \times 10^{-7}$ | | | |
| | AP $-2.2241 \times 10^{-1}$ | | | |
| | BP $-1.5851 \times 10^{-1}$ | | | |
| 6 | ∞(image display plane) | Y 26.126 | θ 50.03° | |
| | | Z 39.439 | | |

Example 4

| Surface No. | Radius of curvature | Surface separation | Refractive index (Displacement) | Abbe's No. (Tilt angle) |
|---|---|---|---|---|
| 1 | ∞(pupil) | | | |
| 2 | $R_y$ $-209.268$ | | 1.4922 | 57.50 |
| | $R_x$ $-95.115$ | Y 18.335 | θ 12.00° | |
| | $K_y$ 0 | Z 27.921 | | |
| | $K_x$ 0 | | | |
| | AR $7.8387 \times 10^{-7}$ | | | |
| | BR $2.9947 \times 10^{-13}$ | | | |
| | CR $1.5297 \times 10^{-14}$ | | | |
| | DR $-5.0289 \times 10^{-17}$ | | | |
| | AP $-4.4990 \times 10^{-1}$ | | | |
| | BP $-7.9471$ | | | |
| | CP $6.5454 \times 10^{-1}$ | | | |
| | DP $-1.3873 \times 10^{-1}$ | | | |
| 3 | $R_y$ $-67.801$ | | 1.4922 | 57.50 |
| | $R_x$ $-58.220$ | Y $-9.356$ | θ $-27.44°$ | |
| | $K_y$ 0 | Z 38.348 | | |
| | $K_x$ 0 | | | |
| | AR $4.2705 \times 10^{-7}$ | | | |
| | BR $-7.7028 \times 10^{-11}$ | | | |
| | CR $4.0793 \times 10^{-22}$ | | | |
| | DR $1.0591 \times 10^{-17}$ | | | |
| | AP $1.0702 \times 10^{-1}$ | | | |
| | BP $4.9674 \times 10^{-1}$ | | | |
| | CP $1.1938 \times 10^{2}$ | | | |
| | DP $-9.2306 \times 10^{-3}$ | | | |
| 4 | $R_y$ $-209.268$ | | 1.4922 | 57.50 |
| | $R_x$ $-95.115$ | Y 18.335 | θ 12.00° | |
| | $K_y$ 0 | Z 27.921 | | |
| | $K_x$ 0 | | | |
| | AR $7.8387 \times 10^{-7}$ | | | |
| | BR $2.9947 \times 10^{-13}$ | | | |
| | CR $1.5297 \times 10^{-14}$ | | | |
| | DR $-5.0289 \times 10^{-17}$ | | | |
| | AP $-4.4990 \times 10^{-1}$ | | | |
| | BP $-7.9471$ | | | |
| | CP $6.5454 \times 10^{-1}$ | | | |
| | DP $-1.3873 \times 10^{-1}$ | | | |
| 5 | ∞ | Y 27.164 | θ 62.56° | |
| | | Z 27.921 | | |
| 6 | ∞(image display plane) | Y 27.678 | θ 46.89° | |
| | | Z 39.000 | | |

Example 5

| Surface No. | Radius of curvature | Surface separation | Refractive index (Displacement) | Abbe's No. (Tilt angle) |
|---|---|---|---|---|
| 1 | ∞(pupil) | | | |
| 2 | $R_y$ $-108.837$ | | 1.4922 | 57.50 |
| | $R_x$ $-59.587$ | Y 22.093 | θ 12.00° | |
| | $K_y$ 0 | Z 28.432 | | |
| | $K_x$ 0 | | | |
| | AR $2.7432 \times 10^{-6}$ | | | |
| | BR $-2.5187 \times 10^{-12}$ | | | |
| | CR $-1.0520 \times 10^{-12}$ | | | |
| | DR $2.0213 \times 10^{-18}$ | | | |
| | AP $-4.8549 \times 10^{-1}$ | | | |
| | BP $-5.5224$ | | | |
| | CP $-5.1184 \times 10^{-1}$ | | | |
| | DP $-3.2482$ | | | |
| 3 | $R_y$ $-56.932$ | | 1.4922 | 57.50 |
| | $R_x$ $-45.872$ | Y $-6.142$ | θ $-29.18°$ | |
| | $K_y$ 0 | Z 37.482 | | |
| | $K_x$ 0 | | | |
| | AR $1.7890 \times 10^{-7}$ | | | |
| | BR $-4.5863 \times 10^{-12}$ | | | |
| | CR $1.3630 \times 10^{-22}$ | | | |
| | DR $-1.6243 \times 10^{-16}$ | | | |
| | AP $-1.0453$ | | | |
| | BP $2.8434$ | | | |
| | CP $2.4780 \times 10^{2}$ | | | |
| | DP $-5.6609 \times 10^{-1}$ | | | |
| 4 | $R_y$ $-108.837$ | | 1.4922 | 57.50 |
| | $R_x$ $-59.587$ | Y 22.093 | θ 12.00° | |
| | $K_y$ 0 | Z 28.432 | | |
| | $K_x$ 0 | | | |
| | AR $2.7432 \times 10^{-6}$ | | | |
| | BR $-2.5187 \times 10^{-12}$ | | | |
| | CR $-1.0520 \times 10^{-12}$ | | | |
| | DR $2.0213 \times 10^{-18}$ | | | |
| | AP $-4.8549 \times 10^{-1}$ | | | |
| | BP $-5.5224$ | | | |
| | CP $-5.1184 \times 10^{-1}$ | | | |
| | DP $-3.2482$ | | | |
| 5 | $R_y$ $-60.909$ | Y 20.307 | θ 59.78° | |
| | $R_x$ 285.974 | Z 33.545 | | |
| | $K_y$ 0 | | | |
| | $K_x$ 0 | | | |
| | AR $-1.7617 \times 10^{-8}$ | | | |
| | BR $-1.5654 \times 10^{-8}$ | | | |
| | AP $-9.1409$ | | | |
| | BP $5.0232 \times 10^{-1}$ | | | |
| 6 | ∞(image display plane) | Y 23.058 | θ 45.58° | |
| | | Z 38.460 | | |

Example 6

| Surface No. | Radius of curvature | Surface separation | Refractive index (Displacement) | Abbe's No. (Tilt angle) |
|---|---|---|---|---|
| 1 | ∞(pupil) | | | |
| 2 | $R_y$ $-101.708$ | | 1.4922 | 57.50 |
| | $R_x$ $-48.160$ | Y 27.508 | θ 11.78° | |
| | $K_y$ 0 | Z 28.509 | | |
| | $K_x$ 0 | | | |
| | AR $2.6185 \times 10^{-6}$ | | | |
| | BR $-3.7487 \times 10^{-12}$ | | | |
| | CR $-2.9205 \times 10^{-13}$ | | | |
| | DR $4.9889 \times 10^{-19}$ | | | |
| | AP $-3.9062 \times 10^{-1}$ | | | |
| | BP $-4.9087$ | | | |
| | CP $-2.1445 \times 10^{-1}$ | | | |
| | DP $-3.7357$ | | | |
| 3 | $R_y$ $-58.072$ | | 1.4922 | 57.50 |
| | $R_x$ $-43.259$ | Y $-3.384$ | θ $-27.95°$ | |
| | $K_y$ 0 | Z 38.847 | | |
| | $K_x$ 0 | | | |
| | AR $2.3538 \times 10^{-8}$ | | | |
| | BR $-1.6651 \times 10^{-10}$ | | | |
| | CR $4.2168 \times 10^{-22}$ | | | |
| | DR $-1.6075 \times 10^{-15}$ | | | |
| | AP $-2.2237$ | | | |
| | BP $1.6221$ | | | |
| | CP $3.4786 \times 10^{2}$ | | | |
| | DP $-4.1619 \times 10^{-1}$ | | | |

| Surface No. | Radius of curvature | Surface separation | Refractive index (Displacement) | | Abbe's No. (Tilt angle) |
|---|---|---|---|---|---|
| 4 | $R_y$ −101.708 | | | | |
|   | $R_x$ −48.160 | | 1.4922 | | 57.50 |
|   | $K_y$ 0 | | Y 27.508 | θ | 11.78° |
|   | $K_x$ 0 | | Z 28.509 | | |
|   | AR 2.6185 × $10^{-6}$ | | | | |
|   | BR −3.7487 × $10^{-12}$ | | | | |
|   | CR −2.9205 × $10^{-13}$ | | | | |
|   | DR 4.9889 × $10^{-19}$ | | | | |
|   | AP −3.9062 × $10^{-1}$ | | | | |
|   | BP −4.9087 | | | | |
|   | CP −2.1445 × $10^{-1}$ | | | | |
|   | DP −3.7357 | | | | |
| 5 | $R_y$ −131.765 | | Y 18.159 | θ | 56.86° |
|   | $R_x$ −87.128 | | Z 38.920 | | |
|   | $K_y$ 0 | | | | |
|   | $K_x$ 0 | | | | |
|   | AR −2.8518 × $10^{-10}$ | | | | |
|   | BR 1.9550 × $10^{-7}$ | | | | |
|   | AP 2.4753 × $10^{2}$ | | | | |
|   | BP −4.7698 × $10^{-1}$ | | | | |
| 6 | ∞(image display plane) | | Y 23.075 | θ | 56.04° |
|   | | | Z 38.778 | | |

Example 7

| Surface No. | Radius of curvature | Surface separation | Refractive index (Displacement) | | Abbe's No. (Tilt angle) |
|---|---|---|---|---|---|
| 1 | ∞(pupil) | | | | |
| 2 | $R_y$ −222.115 | | 1.4922 | | 57.50 |
|   | $R_x$ −108.768 | | Y 4.082 | θ | 8.45° |
|   | $K_y$ 0 | | Z 31.403 | | |
|   | $K_x$ 0 | | | | |
|   | AR −1.7752 × $10^{-6}$ | | | | |
|   | BR 1.6547 × $10^{-12}$ | | | | |
|   | CR −4.2898 × $10^{-14}$ | | | | |
|   | DR −5.7021 × $10^{-16}$ | | | | |
|   | AP −1.6375 × $10^{-2}$ | | | | |
|   | BP 1.0640 × $10^{1}$ | | | | |
|   | CP 2.4011 | | | | |
|   | DP −4.9447 × $10^{-1}$ | | | | |
| 3 | $R_y$ −64.499 | | 1.4922 | | 57.50 |
|   | $R_x$ −56.364 | | Y 4.310 | θ | −15.03° |
|   | $K_y$ 0 | | Z 44.401 | | |
|   | $K_x$ 0 | | | | |
|   | AR −8.0695 × $10^{-7}$ | | | | |
|   | BR −3.9430 × $10^{-15}$ | | | | |
|   | CR 2.7429 × $10^{-13}$ | | | | |
|   | DR −1.3357 × $10^{-15}$ | | | | |
|   | AP −9.6954 × $10^{-2}$ | | | | |
|   | BP −2.7055 × $10^{1}$ | | | | |
|   | CP −2.0598 × $10^{-1}$ | | | | |
|   | DP 1.2686 × $10^{-1}$ | | | | |
| 4 | $R_y$ −222.115 | | 1.4922 | | 57.50 |
|   | $R_x$ −108.768 | | Y 4.082 | θ | 8.45° |
|   | $K_y$ 0 | | Z 31.403 | | |
|   | $K_x$ 0 | | | | |
|   | AR −1.7752 × $10^{-6}$ | | | | |
|   | BR 1.6547 × $10^{-12}$ | | | | |
|   | CR −4.2898 × $10^{-14}$ | | | | |
|   | DR −5.7021 × $10^{-16}$ | | | | |
|   | AP −1.6375 × $10^{-2}$ | | | | |
|   | BP 1.0640 × $10^{1}$ | | | | |
|   | CP 2.4011 | | | | |
|   | DP −4.9447 × $10^{-1}$ | | | | |
| 5 | $R_y$ 118.008 | | Y 15.216 | θ | 58.67° |
|   | $R_x$ −757.845 | | Z 47.361 | | |
|   | $K_y$ 0 | | | | |
|   | $K_x$ 0 | | | | |
|   | AR −2.9567 × $10^{-5}$ | | | | |
|   | BR 1.8380 × $10^{-7}$ | | | | |
|   | CR −3.8357 × $10^{-10}$ | | | | |
|   | DR 3.5330 × $10^{-13}$ | | | | |
|   | AP −1.8578 × $10^{-1}$ | | | | |
|   | BP −5.8912 × $10^{-1}$ | | | | |
|   | CP −6.9334 × $10^{-1}$ | | | | |
|   | DP −7.1416 × $10^{-1}$ | | | | |
| 6 | ∞(image display plane) | | Y 25.643 | θ | 51.96° |
|   | | | Z 38.337 | | |

Example 8

| Surface No. | Radius of curvature | Surface separation | Refractive index (Displacement) | | Abbe's No. (Tilt angle) |
|---|---|---|---|---|---|
| 1 | ∞(pupil) | | | | |
| 2 | $R_y$ −132.922 | | 1.4922 | | 57.50 |
|   | $R_x$ −71.352 | | Y 46.908 | θ | 19.12° |
|   | $K_y$ 0 | | Z 21.772 | | |
|   | $K_x$ 0 | | | | |
|   | AR 6.1010 × $10^{-7}$ | | | | |
|   | BR 2.2759 × $10^{-16}$ | | | | |
|   | CR −3.0977 × $10^{-14}$ | | | | |
|   | DR −2.4990 × $10^{-14}$ | | | | |
|   | AP −1.0073 × $10^{-1}$ | | | | |
|   | BP −5.2905 × $10^{1}$ | | | | |
|   | CP −4.8335 × $10^{-1}$ | | | | |
|   | DP −1.0842 | | | | |
| 3 | $R_y$ −74.200 | | 1.4922 | | 57.50 |
|   | $R_x$ −55.319 | | Y −0.854 | θ | −21.63° |
|   | $K_y$ 0 | | Z 41.928 | | |
|   | $K_x$ 0 | | | | |
|   | AR −3.7465 × $10^{-8}$ | | | | |
|   | BR −3.1477 × $10^{-14}$ | | | | |
|   | CR 3.7444 × $10^{-19}$ | | | | |
|   | DR 2.6823 × $10^{-18}$ | | | | |
|   | AP 3.7231 | | | | |
|   | BP −2.8232 × $10^{1}$ | | | | |
|   | CP −4.4670 × $10^{1}$ | | | | |
|   | DP 9.1946 × $10^{-1}$ | | | | |
| 4 | $R_y$ −132.922 | | 1.4922 | | 57.50 |
|   | $R_x$ −71.352 | | Y 46.908 | θ | 19.12° |
|   | $K_y$ 0 | | Z 21.772 | | |
|   | $K_x$ 0 | | | | |
|   | AR 6.1010 × $10^{-7}$ | | | | |
|   | BR 2.2759 × $10^{-16}$ | | | | |
|   | CR −3.0977 × $10^{-14}$ | | | | |
|   | DR −2.4990 × $10^{-14}$ | | | | |
|   | AP −1.0073 × $10^{-1}$ | | | | |
|   | BP −5.2905 × $10^{1}$ | | | | |
|   | CP −4.8335 × $10^{-1}$ | | | | |
|   | DP −1.0842 | | | | |
| 5 | ∞ | | Y 25.227 | θ | 58.24° |
|   | | | Z 32.426 | | |
| 6 | ∞(image display plane) | | Y 27.349 | θ | 51.61° |
|   | | | Z 38.220 | | |

Example 9

| Surface No. | Radius of curvature | Surface separation | Refractive index (Displacement) | | Abbe's No. (Tilt angle) |
|---|---|---|---|---|---|
| 1 | ∞(pupil) | | | | |
| 2 | $R_y$ −88.296 | | 1.4922 | | 57.50 |
|   | $R_x$ −63.769 | | Y 36.547 | θ | 17.95° |
|   | $K_y$ 0 | | Z 25.432 | | |
|   | $K_x$ 0 | | | | |
|   | AR 2.0471 × $10^{-6}$ | | | | |
|   | BR 1.6365 × $10^{-15}$ | | | | |
|   | CR −4.7497 × $10^{-14}$ | | | | |
|   | DR −4.8723 × $10^{-16}$ | | | | |
|   | AP −3.2624 × $10^{-1}$ | | | | |
|   | BP 5.3482 × $10^{1}$ | | | | |
|   | CP 2.3057 × $10^{-1}$ | | | | |
|   | DP −6.9041 × $10^{-1}$ | | | | |
| 3 | $R_y$ −67.943 | | 1.4922 | | 57.50 |
|   | $R_x$ −53.285 | | Y 8.883 | θ | −14.10° |
|   | $K_y$ 0 | | Z 44.432 | | |
|   | $K_x$ 0 | | | | |
|   | AR 1.3268 × $10^{-9}$ | | | | |
|   | BR −1.0149 × $10^{-11}$ | | | | |
|   | CR 1.6128 × $10^{-19}$ | | | | |
|   | DR −1.2191 × $10^{-15}$ | | | | |
|   | AP −2.2870 × $10^{1}$ | | | | |
|   | BP −3.5198 | | | | |
|   | CP 1.3749 × $10^{1}$ | | | | |
|   | DP 1.4258 × $10^{-1}$ | | | | |
| 4 | $R_y$ −88.296 | | 1.4922 | | 57.50 |
|   | $R_x$ −63.769 | | Y 36.547 | θ | 17.95° |
|   | $K_y$ 0 | | Z 25.432 | | |
|   | $K_x$ 0 | | | | |
|   | AR 2.0471 × $10^{-6}$ | | | | |
|   | BR 1.6365 × $10^{-15}$ | | | | |

-continued

| Surface No. | Radius of curvature | Surface separation | Refractive index (Displacement) | Abbe's No. (Tilt angle) |
|---|---|---|---|---|
| | CR $-4.7497 \times 10^{-14}$ | | | |
| | DR $-4.8723 \times 10^{-16}$ | | | |
| | AP $-3.2624 \times 10^{-1}$ | | | |
| | BP $5.3482 \times 10^{1}$ | | | |
| | CP $2.3057 \times 10^{-1}$ | | | |
| | DP $-6.9041 \times 10^{-1}$ | | | |
| 5 | $R_y$ $-32.889$ | | Y 23.759 | θ 60.28° |
| | $R_x$ $-33.803$ | | Z 35.186 | |
| | $K_y$ 0 | | | |
| | $K_x$ 0 | | | |
| | AR $8.3812 \times 10^{-5}$ | | | |
| | BR $-1.3039 \times 10^{-7}$ | | | |
| | AP $3.3959 \times 10^{-2}$ | | | |
| | BP $1.4213 \times 10^{-1}$ | | | |
| 6 | ∞(image display plane) | | Y 26.330 | θ 47.54° |
| | | | Z 40.464 | |

Example 10

| Surface No. | Radius of curvature | Surface separation | Refractive index (Displacement) | Abbe's No. (Tilt angle) |
|---|---|---|---|---|
| 1 | ∞(pupil) | | | |
| 2 | $R_y$ $-197.607$ | | 1.4922 | 57.50 |
| | $R_x$ $-93.039$ | | Y $-23.914$ | θ $-0.85°$ |
| | $K_y$ 0 | | Z 32.039 | |
| | $K_x$ 0 | | | |
| | AR $1.8277 \times 10^{-7}$ | | | |
| | BR $-1.8766 \times 10^{-15}$ | | | |
| | CR $-3.4289 \times 10^{-14}$ | | | |
| | DR $-1.8200 \times 10^{-15}$ | | | |
| | AP $-6.0657 \times 10^{-2}$ | | | |
| | BP $-3.0358 \times 10^{1}$ | | | |
| | CP $4.5171 \times 10^{-2}$ | | | |
| | DP $-7.8137 \times 10^{-1}$ | | | |
| 3 | $R_y$ $-66.609$ | | 1.4922 | 57.50 |
| | $R_x$ $-54.458$ | | Y 2.036 | θ $-17.72°$ |
| | $K_y$ 0 | | Z 42.342 | |
| | $K_x$ 0 | | | |
| | AR $-5.5369 \times 10^{-7}$ | | | |
| | BR $1.6194 \times 10^{-15}$ | | | |
| | CR $-3.4397 \times 10^{-20}$ | | | |
| | DR $-1.0500 \times 10^{-15}$ | | | |
| | AP $1.5438 \times 10^{-1}$ | | | |
| | BP $6.3209 \times 10^{1}$ | | | |
| | CP $7.3075 \times 10^{1}$ | | | |
| | DP $-3.6019 \times 10^{-1}$ | | | |
| 4 | $R_y$ $-197.607$ | | 1.4922 | 57.50 |
| | $R_x$ $-93.039$ | | Y $-23.914$ | θ $-0.85°$ |
| | $K_y$ 0 | | Z 32.039 | |
| | $K_x$ 0 | | | |
| | AR $1.8277 \times 10^{-7}$ | | | |
| | BR $-1.8766 \times 10^{-15}$ | | | |
| | CR $-3.4289 \times 10^{-14}$ | | | |
| | DR $-1.8200 \times 10^{-15}$ | | | |
| | AP $-6.0657 \times 10^{-2}$ | | | |
| | BP $-3.0358 \times 10^{1}$ | | | |
| | CP $4.5171 \times 10^{-2}$ | | | |
| | DP $-7.8137 \times 10^{-1}$ | | | |
| 5 | $R_y$ $-26.823$ | | Y 24.160 | θ 73.22° |
| | $R_x$ $-57.799$ | | Z 32.035 | |
| | $K_y$ 0 | | | |
| | $K_x$ 0 | | | |
| | AR $8.2293 \times 10^{-7}$ | | | |
| | BR $4.2412 \times 10^{-8}$ | | | |
| | AP $-4.3064$ | | | |
| | BP $2.2521 \times 10^{-1}$ | | | |
| 6 | ∞(image display plane) | | Y 25.719 | θ 52.01° |
| | | | Z 40.064 | |

Example 11

| Surface No. | Radius of curvature | Surface separation | Refractive index (Displacement) | Abbe's No. (Tilt angle) |
|---|---|---|---|---|
| 1 | ∞(pupil) | | | |
| 2 | $-2227.303$ | | 1.4870 | 70.40 |
| | | | Y 0 | θ 0 |
| | | | Z 32.000 | |
| 3 | $R_y$ $-86.054$ | | 1.4870 | 70.40 |
| | $R_x$ $-71.847$ | | Y 3.478 | θ 29.21° |
| | $K_y$ $-0.8934$ | | Z 50.000 | |
| | $K_x$ $-0.2048$ | | | |
| | AR $-3.3277 \times 10^{-8}$ | | | |
| | BR $-3.2956 \times 10^{-11}$ | | | |
| | AP $2.6243 \times 10^{-1}$ | | | |
| | BP $6.7193 \times 10^{-1}$ | | | |
| 4 | $R_y$ $-70.490$ | | 1.4780 | 70.40 |
| | $R_x$ $-52.620$ | | Y $-13.000$ | θ 18.37° |
| | $K_y$ 0 | | Z 34.000 | |
| | $K_x$ 0 | | | |
| | AR $-7.6251 \times 10^{-8}$ | | | |
| | BR $-2.2778 \times 10^{-10}$ | | | |
| | AP $-1.6010$ | | | |
| | BP $-1.5837$ | | | |
| 5 | 85.106 | | Y $-32.132$ | θ $-34.75°$ |
| | | | Z 40.966 | |
| 6 | ∞(image display plane) | | Y $-30.195$ | θ $-19.83°$ |
| | | | Z 53.755 | |

Example 12

| Surface No. | Radius of curvature | Surface separation | Refractive index (Displacement) | Abbe's No. (Tilt angle) |
|---|---|---|---|---|
| 1 | ∞(pupil) | | | |
| 2 | $R_y$ $-184.925$ | | 1.5163 | 64.15 |
| | $R_x$ $-61.181$ | | Y 44.369 | θ 12.05° |
| | $K_y$ 0 | | Z 25.729 | |
| | $K_x$ 0 | | | |
| | AR $3.1956 \times 10^{-7}$ | | | |
| | AP $-5.1238 \times 10^{-1}$ | | | |
| 3 | $R_y$ $-487.968$ | | 1.5163 | 64.15 |
| | $R_x$ $-99.634$ | | Y 74.329 | θ $-10.35°$ |
| | $K_y$ 0 | | Z 62.699 | |
| | $K_x$ 0 | | | |
| | AR $-1.2921 \times 10^{-7}$ | | | |
| | AP $-1.4792 \times 10^{-2}$ | | | |
| 4 | $R_y$ $-184.925$ | | 1.5163 | 64.15 |
| | $R_x$ $-61.181$ | | Y 44.369 | θ 12.05° |
| | $K_y$ 0 | | Z 25.729 | |
| | $K_x$ 0 | | | |
| | AR $3.1956 \times 10^{-7}$ | | | |
| | AP $-5.1238 \times 10^{-1}$ | | | |
| 5 | $R_y$ $-74.831$ | | 1.5163 | 64.15 |
| | $R_x$ $-50.313$ | | Y 57.881 | θ 40.81° |
| | $K_y$ 0 | | Z 26.628 | |
| | $K_x$ 0 | | | |
| | AR $1.2467 \times 10^{-6}$ | | | |
| | AP $-2.5139 \times 10^{-1}$ | | | |
| 6 | $R_y$ $-184.925$ | | 1.5163 | 64.15 |
| | $R_x$ $-61.181$ | | Y 44.369 | θ 12.05° |
| | $K_y$ 0 | | Z 25.729 | |
| | $K_x$ 0 | | | |
| | AR $3.1956 \times 10^{-7}$ | | | |
| | AP $-5.1238 \times 10^{-1}$ | | | |
| 7 | $R_y$ $-74.831$ | | Y 57.881 | θ 40.81° |
| | $R_x$ $-50.313$ | | Z 26.628 | |
| | $K_y$ 0 | | | |
| | $K_x$ 0 | | | |
| | AR $1.2467 \times 10^{-6}$ | | | |
| | AP $-2.5139 \times 10^{-1}$ | | | |
| 8 | ∞(image display plane) | | Y 53.450 | θ 32.43° |
| | | | Z 33.783 | |

Example 13

| Surface No. | Radius of curvature | Surface separation | Refractive index (Displacement) | Abbe's No. (Tilt angle) |
|---|---|---|---|---|
| 1 | ∞(pupil) | | | |
| 2 | $R_y$ $-222.598$ | | 1.5163 | 64.15 |
| | $R_x$ $-45.882$ | | Y 43.511 | θ 11.02° |
| | $K_y$ 0 | | Z 25.858 | |
| | $K_x$ 0 | | | |
| | AR $1.1482 \times 10^{-6}$ | | | |
| | BR $-1.1995 \times 10^{-12}$ | | | |
| | AP $-8.9258 \times 10^{-1}$ | | | |
| | BP $8.4007 \times 10^{-2}$ | | | |
| 3 | $R_y$ $-498.422$ | | 1.5163 | 64.15 |
| | $R_x$ $-88.841$ | | Y 93.913 | θ $-3.03°$ |
| | $K_y$ 0 | | Z 60.116 | |
| | $K_x$ 0 | | | |
| | AR $-1.0565 \times 10^{-7}$ | | | |
| | BR $-1.1420 \times 10^{-14}$ | | | |
| | AP $-7.0202 \times 10^{-2}$ | | | |
| | BP $2.8296 \times 10^{-1}$ | | | |
| 4 | $R_y$ $-222.598$ | | 1.5163 | 64.15 |

-continued

| Surface No. | Radius of curvature | Surface separation | Refractive index (Displacement) | Abbe's No. (Tilt angle) |
|---|---|---|---|---|
| | $R_x$ −45.882 | | Y 43.511 | θ 11.02° |
| | $K_y$ 0 | | Z 25.858 | |
| | $K_x$ 0 | | | |
| | AR 1.1482 × $10^{-6}$ | | | |
| | BR −1.1995 × $10^{-12}$ | | | |
| | AP −8.9258 × $10^{-1}$ | | | |
| | BP 8.4007 × $10^{-2}$ | | | |
| 5 | $R_y$ −87.777 | | 1.5163 | 64.15 |
| | $R_x$ −37.219 | | Y 58.503 | θ 37.54° |
| | $K_y$ 0 | | Z 26.595 | |
| | $K_x$ 0 | | | |
| | AR 2.1582 × $10^{-6}$ | | | |
| | BR −3.4935 × $10^{-12}$ | | | |
| | AP −6.1663 × $10^{-1}$ | | | |
| | BP 1.2117 × $10^{-1}$ | | | |
| 6 | $R_y$ −222.598 | | 1.5163 | 64.15 |
| | $R_x$ −45.882 | | Y 43.511 | θ 11.02° |
| | $K_y$ 0 | | Z 25.858 | |
| | $K_x$ 0 | | | |
| | AR 1.1482 × $10^{-6}$ | | | |
| | BR −1.1995 × $10^{-12}$ | | | |
| | AP −8.9258 × $10^{-1}$ | | | |
| | BP 8.4007 × $10^{-2}$ | | | |
| 7 | $R_y$ −87.777 | | Y 58.503 | θ 37.54° |
| | $R_x$ −37.219 | | Z 26.595 | |
| | $K_y$ 0 | | | |
| | $K_x$ 0 | | | |
| | AR 2.1582 × $10^{-6}$ | | | |
| | BR −3.4935 × $10^{-12}$ | | | |
| | AP −6.1663 × $10^{-1}$ | | | |
| | BP 1.2117 × $10^{-1}$ | | | |
| 8 | ∞(image display plane) | | Y 51.630 | θ 36.57° |
| | | | Z 34.677 | |

Example 14

| 1 | ∞(pupil) | 30.000 | | |
| 2 | ∞ | 1.500 | 1.4922 | 57.50 |
| 3 | ∞ | 14.500 | | |
| 4 | ∞ | 1.414 | 1.5163 | 64.15 |
| | | | | θ 45.00° |
| 5 | ∞ | 18.586 | | θ 45.00° |
| 6 | ∞ | 4.000 | 1.5163 | 64.15 |
| 7 | −140.039 | −4.000 | 1.5163 | 64.15 |
| 8 | ∞ | −18.586 | | |
| 9 | ∞ | 22.774 | | θ 45.00° |
| 10 | ∞(image display plane) | | | |

Example 15

| 1 | ∞(pupil) | 23.00 | | |
| 2 | ∞ | 11.25 | 1.52540 | 56.26 |
| 3 | ∞ | −12.75 | 1.52540 | 56.26 |
| | | | | θ 45.00° |
| 4 | 77.2112 | 23.75 | 1.52540 | 56.26 |
| 5 | 681.3345 | 8.46 | | |
| | K 0 | | | |
| | A 4.7647 × $10^{-5}$ | | | |
| | B −9.9862 × $10^{-8}$ | | | |
| | C 9.7000 × $10^{-11}$ | | | |
| 6 | ∞ | 1.02 | 1.51633 | 64.15 |
| 7 | ∞(image display plane) | | | |

Example 16

| 1 | ∞(pupil) | 23.00 | | |
| 2 | $R_y$ −96.055 | | 1.5254 | 56.25 |
| | $R_x$ −58.804 | | Y 8.441 | θ 5.25° |
| | $K_y$ 0 | | Z 35.130 | |
| | $K_x$ 0 | | | |
| | AR 8.3274 × $10^{-7}$ | | | |
| | BR −1.2549 × $10^{-10}$ | | | |
| | CR −9.8991 × $10^{-13}$ | | | |
| | DR −1.7525 × $10^{-17}$ | | | |
| | AP −8.5224 × $10^{-1}$ | | | |
| | BP −2.7723 | | | |
| | CP −4.1940 × $10^{-1}$ | | | |
| | DP 7.9585 × $10^{-1}$ | | | |
| 3 | $R_y$ −49.966 | | 1.5254 | 56.25 |
| | $R_x$ −52.244 | | Y 20.887 | θ 46.21° |
| | $K_y$ −0.1183 | | Z 32.695 | |
| | $K_x$ −0.0054 | | | |
| | AR 6.9845 × $10^{-7}$ | | | |
| | BR −2.7268 × $10^{-12}$ | | | |
| | CR −3.4032 × $10^{-14}$ | | | |
| | DR −4.9071 × $10^{-21}$ | | | |
| | AP 1.0961 × $10^{-1}$ | | | |
| | BP −4.6485 | | | |
| | CP −2.3462 × $10^{-1}$ | | | |
| | DP 3.0671 | | | |
| 4 | $R_y$ −96.055 | | 1.5254 | 56.25 |
| | $R_x$ −58.804 | | Y 8.441 | θ 5.25° |
| | $K_y$ 0 | | Z 35.130 | |
| | $K_x$ 0 | | | |
| | AR 8.3274 × $10^{-7}$ | | | |
| | BR −1.2549 × $10^{-10}$ | | | |
| | CR −9.8991 × $10^{-13}$ | | | |
| | DR −1.7525 × $10^{-17}$ | | | |
| | AP −8.5224 × $10^{-1}$ | | | |
| | BP −2.7723 | | | |
| | CP −4.1940 × $10^{-1}$ | | | |
| | DP 7.9585 × $10^{-1}$ | | | |
| 5 | $R_y$ −198.343 | | 1.5254 | 56.25 |
| | $R_x$ −144.874 | | Y 33.806 | θ 4.64° |
| | $K_y$ 0.4297 | | Z 49.896 | |
| | $K_x$ 4.4221 | | | |
| | AR 3.1878 × $10^{-7}$ | | | |
| | BR −2.3143 × $10^{-12}$ | | | |
| | CR 4.0785 × $10^{-12}$ | | | |
| | DR −1.2920 × $10^{-18}$ | | | |
| | AP 4.6911 × $10^{-2}$ | | | |
| | BP 1.5938 | | | |
| | CP −1.0746 | | | |
| | DP −1.7627 | | | |
| 6 | $R_y$ 56.215 | | Y −29.162 | θ 40.57° |
| | $R_x$ −49.739 | | Z 38.706 | |
| | $K_y$ 20.0000 | | | |
| | $K_x$ 3.7003 | | | |
| | AR −4.2296 × $10^{-5}$ | | | |
| | BR 2.1610 × $10^{-10}$ | | | |
| | CR −3.8554 × $10^{-10}$ | | | |
| | DR 1.4319 × $10^{-12}$ | | | |
| | AP 3.5603 × $10^{-1}$ | | | |
| | BP 6.2783 × $10^{-1}$ | | | |
| | CP −6.5895 × $10^{-1}$ | | | |
| | DP −5.8883 × $10^{-1}$ | | | |
| 7 | ∞(image display plane) | | Y −34.794 | θ 42.00° |
| | | | Z 36.818 | |

Figure 17:
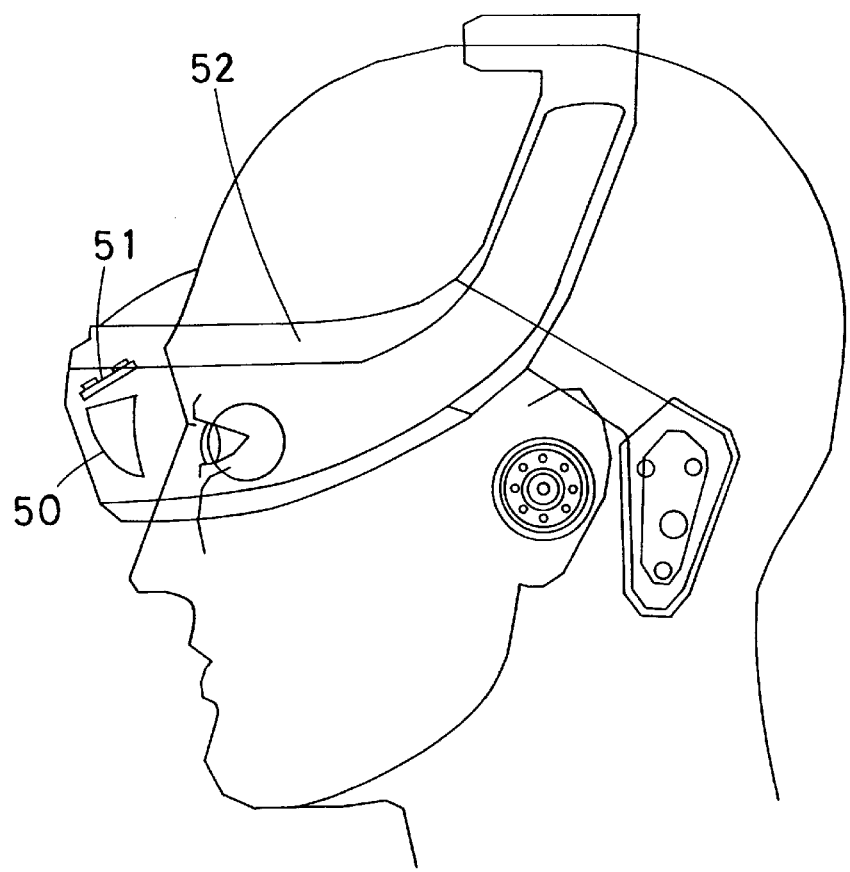
FIG. 17 shows the way in which an image display apparatus according to the present invention is fitted on an observer's head.
Figure 18:
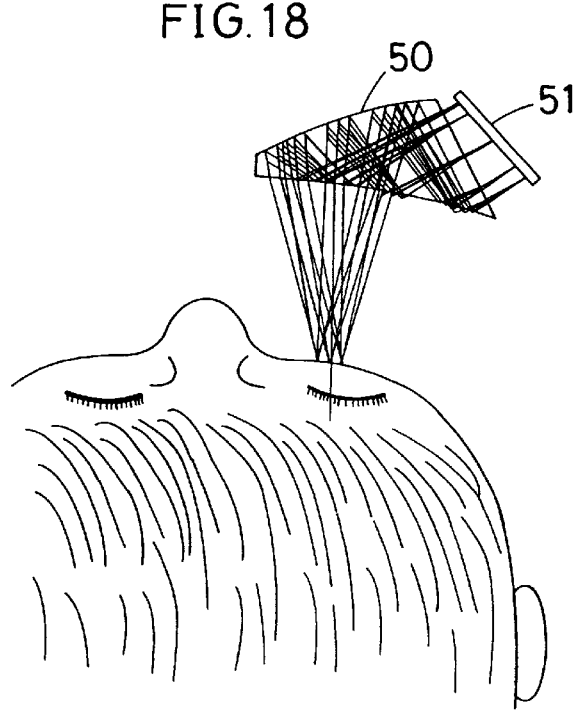
FIG. 18 shows an optical system for a right eye of another image display apparatus according to the present invention as seen from above an observer's head on which the image display apparatus is fitted.

An ocular optical system such as that shown in each of the above-described examples is secured to an observer's head or face as shown, for example, in FIG. 17, which shows the way in which the ocular optical system 50 is fitted to an observer's head, together with an image display device 51, by a support member 52. The image display apparatus shown in FIG. 17 is arranged such that, when it is fitted on the observer's head, an observer's pupil lies within the exit pupil of the ocular optical system 50. As shown in FIG. 18, which shows an optical system for a right eye as seen from above the observer's head, the ocular optical system 50 may be disposed such that the Y-axis of the ocular optical system 50 lies in the horizontal direction with respect to the observer's face.

It is also possible to form an image display apparatus which enables the observer to view an image with both eyes by preparing a pair of such combinations of an ocular optical system and an image display device for the left and right eyes, and securing them together with a support member.

As to the image display device, it is preferable to use a two-dimensional image display device, e.g. a liquid-crystal display, from the viewpoint of reducing the size and weight of the image display apparatus.

Figure 19:
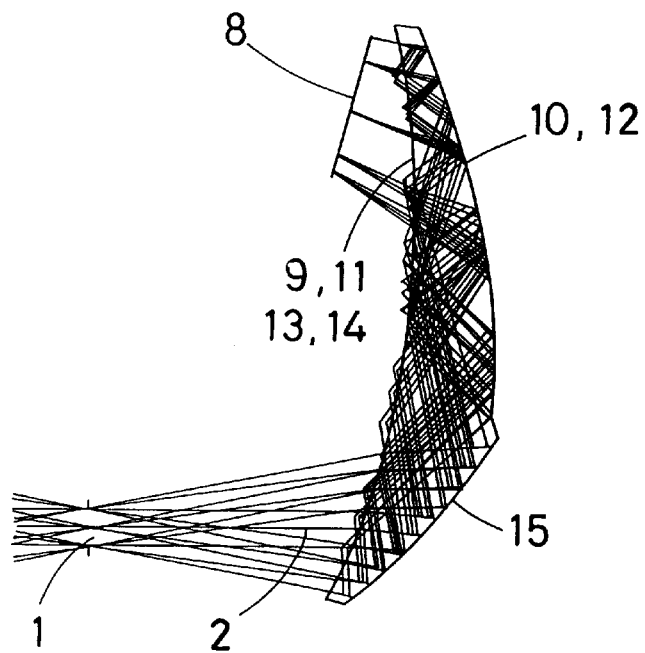
FIG. 19 is a sectional view of another ocular optical system applicable to the image display apparatus according to the present invention.
Figure 20:
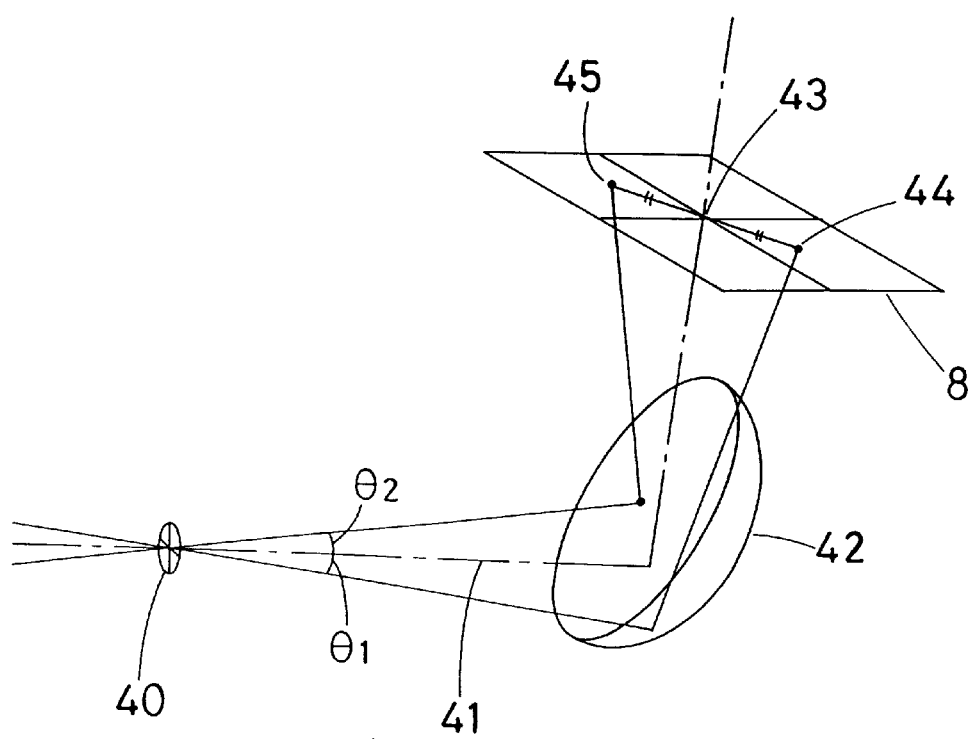
FIG. 20 is a view for describing angles $\Theta_1$ and $\Theta_2$.
Figure 21:
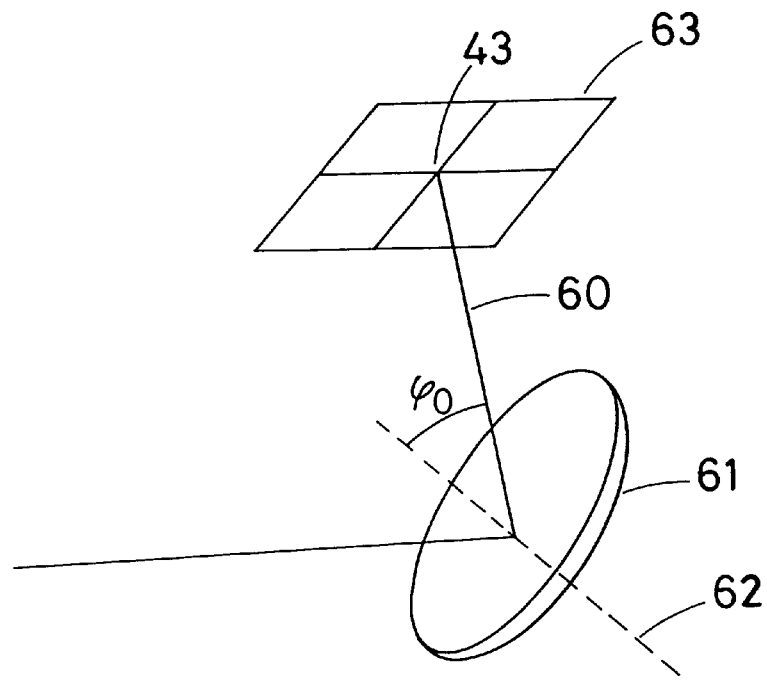
FIG. 21 is a view for describing an angle $\phi_0$.
Figure 22:
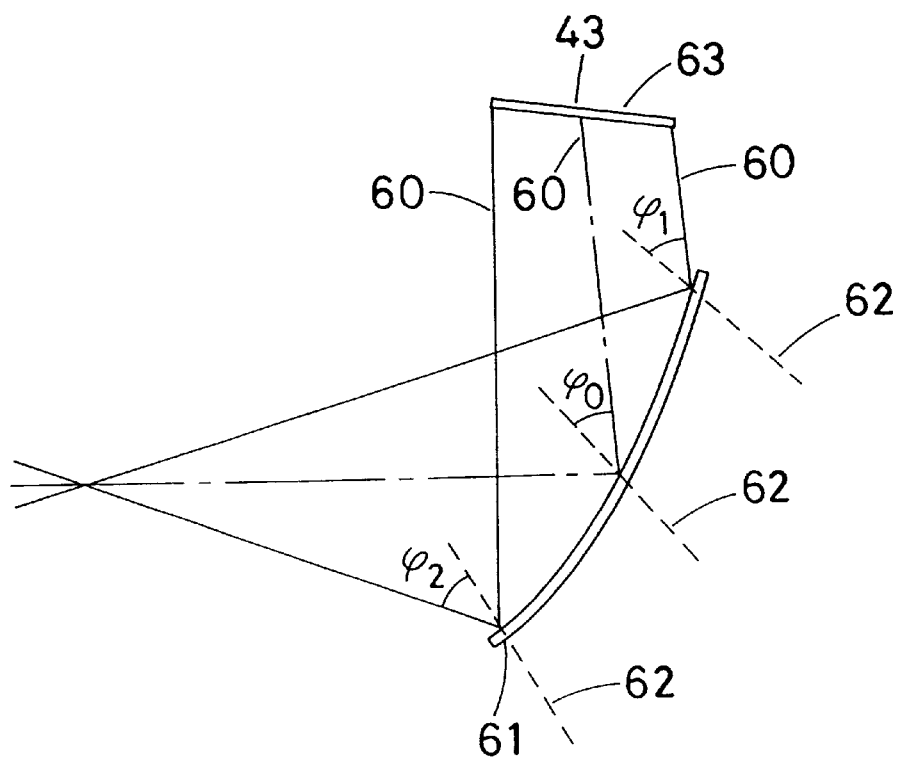
FIG. 22 is a view for describing angles $\phi_0$, $\phi_1$ and $\phi_2$.
Figure 23A:
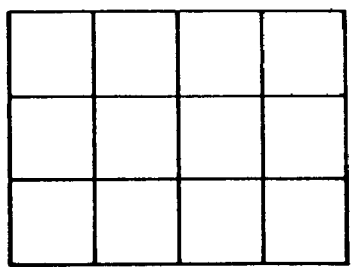
FIG. 23(a) illustrates left and right images displayed for an observer.
Figure 23A:
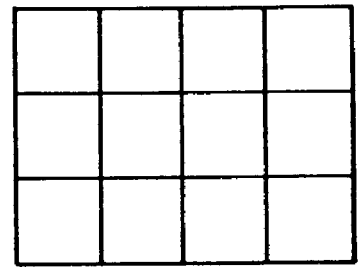
Figure 23B:
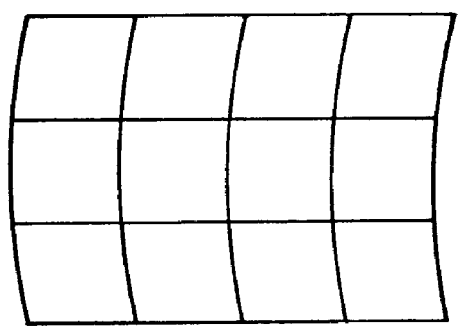
FIG. 23(b) illustrates left and right images which are asymmetrically distorted.
Figure 23B:
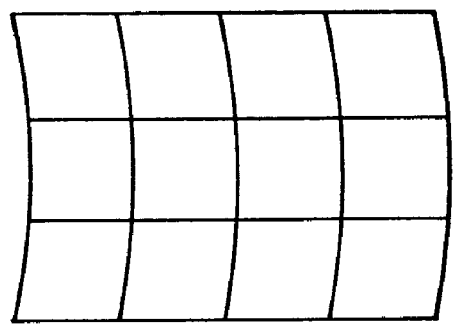

Further, the image display apparatus according to the present invention can also be carried out by using an ocular optical system such as that shown in the sectional view of FIG. 19 (description of values of constituent parameters is omitted). In this optical system, light rays emitted from an image display surface 8 of an image display device enter the optical system through a first transmitting surface 9 and are reflected successively by a first reflecting surface 10, a second reflecting surface 11, a third reflecting surface 12, a fourth reflecting surface 13, and a fifth reflecting surface 15. Thereafter, the reflected light rays pass through a second transmitting surface 14 to enter an observer's eyeball placed in an exit pupil 1 of the ocular optical system.

In this case, the first transmitting surface 9, the second reflecting surface 11, the fourth reflecting surface 13 and the second transmitting surface 14 are disposed at the same position and with the same configuration, and the first reflecting surface 10 and the third reflecting surface 12 are disposed at the same position and with the same configuration.

As will be clear from the foregoing description, the image display apparatus according to the present invention is arranged to satisfy the following condition:

$$|\tan \Theta_1 - \tan \Theta_2|/\tan \Theta_1 < 0.1 \tag{1}$$

where $\Theta_1$ is an angle made between a light ray emitted from an arbitrary point on an image display device and passing through the center of an exit pupil and a visual axis, that is, a straight line connecting the center of an observer's pupil and the center of a projected image of the image display device, and $\Theta_2$ is an angle made between the visual axis and a light ray emitted from a point which is in point symmetry with the arbitrary point about the center of the image display surface of the image display device and passing through the center of the exit pupil.

Accordingly, it is possible to provide an image display apparatus corrected for distortion, particularly a distortion which is asymmetric with respect to the center of the image field.

What we claim is:

1. An image display apparatus comprising:
   an image display device; and
   an ocular optical system having one of a rotationally asymmetric optical surface and a decentered optical surface having a power;
   said image display apparatus satisfying the following conditions:

$$|\tan \Theta_1 - \tan \Theta_2|/\tan \Theta_1 < 0.1 \tag{1}$$

where $\Theta_1$ is an angle made between a light ray emitted from an arbitrary point on said image display device and passing through a center of an exit pupil and a visual axis, that is, a straight line connecting a center of an observer's pupil and a center of a projected image of said image display device, and $\Theta_2$ is an angle made between the visual axis and a light ray emitted from a point which is in point symmetry with said arbitrary point about a center of an image display surface of said image display device and passing through the center of the exit pupils;
   said ocular optical system having a prism member, said prism member including an entrance surface through which a bundle of light rays enters said prism member, reflecting surfaces that reflect the rays in said prism member, and an exit surface through which the rays exit from said prism member; and
   said reflecting surfaces comprising at least four reflecting surfaces that are arranged to fold an optical path by at least four reflections.

2. An image display apparatus according to claim 1, said image display apparatus satisfying the following condition:

$$|\tan \Theta_1 - \tan \Theta_2|/\tan \Theta_1 < 0.05 \tag{2}$$

3. An image display apparatus according to claim 1, said image display apparatus satisfying the following condition:

$$|\tan \Theta_1 - \tan \Theta_2|/\tan \Theta_1 < 0.025 \tag{3}$$

4. An image display apparatus comprising:
   an image display device; and
   an ocular optical system;
   said image display apparatus satisfying the following condition:

$$|\tan \Theta'_1 - \tan \Theta'_2|/\tan \Theta'_1 < 0.1 \tag{4}$$

where $\Theta'_1$ is an angle made between a light ray emitted from an arbitrary point on said image display device and passing through an arbitrary point in an exit pupil in which an image is observable, and a visual axis, that is, a straight line connecting a center of an observer's pupil and a center of a projected image of said image display device, and $\Theta'_2$ is an angle made between the visual axis and a light ray emitted from a point which is in point symmetry with said arbitrary point about a center of an image display surface of said image display device and passing through the arbitrary point in said exit pupil;
   said ocular optical system having a prism member, said prism member including an entrance surface through which a bundle of light rays enters said prism member, reflecting surfaces that reflect the rays in said prism member, and an exit surface through which the rays exit from said prism member; and
   said reflecting surfaces comprising at least four reflecting surfaces that are arranged to fold an optical path by at least four reflections.

5. An image display apparatus according to claim 4, said image display apparatus satisfying the following condition:

$$|\tan \Theta'_1 - \tan \Theta'_2|/\tan \Theta_1 < 0.05 \tag{5}$$

6. An image display apparatus according to claim 4, said image display apparatus satisfying the following condition:

$$|\tan \Theta'_1 - \tan \Theta'_2|/\tan \Theta'_1 < 0.025 \tag{6}$$

7. An image display apparatus according to claim 1 or 4, wherein said ocular optical system leads the image without forming an intermediate image.

8. An image display apparatus according to claim 1 or 4, wherein said ocular optical system has a second surface which is a concave mirror provided to face an observer's eyeball at a tilt to the visual axis, and said ocular optical system leads the image without forming an intermediate image.

9. An image display apparatus according to claim 8, which satisfies the following condition:

$$15° < \phi_0 < 40° \tag{7}$$

where $\phi_0$ is an incident angle made between a principal ray emitted from a center of said image display device and a line normal to said concave mirror at a point where said principal ray is incident on said concave mirror.

10. An image display apparatus according to claim 8, said image display apparatus satisfying the following condition:

$$20° < \phi_0 < 25°  \quad (8)$$

where $\phi_0$ is an incident angle made between a principal ray emitted from a center of said image display device and a line normal to said concave mirror at a point where said principal ray is incident on said concave mirror.

11. An image display apparatus according to claim 8, said image display apparatus satisfying the following condition:

$$21° < \phi_0 < 24° \quad (9)$$

where $\phi_0$ is an incident angle made between a principal ray emitted from a center of said image display device and a line normal to said concave mirror at a point where said principal ray is incident on said concave mirror.

12. An image display apparatus according to claim 8, wherein said ocular optical system has a configuration that is symmetric with respect to a certain plane and satisfies the following condition:

$$|\phi_1 - \phi_2| < 15° \quad (10)$$

where $\phi_1$ and $\phi_2$ are incident angles made between, on the one hand, principal rays emitted from both ends of a section of said image display device taken along said plane and, on the other, lines normal to said concave mirror at respective points where said principal rays are incident on said concave mirror.

13. An image display apparatus according to claim 8, wherein said ocular optical system has a configuration that is symmetric with respect to a certain plane and that satisfies the following condition:

$$|\phi_1 - \phi_2| < 5° \quad (11)$$

where $\phi_1$ and $\phi_2$ are incident angles made between, on the one hand, principal rays emitted from both ends of a section of said image display device taken along said plane and, on the other hand, lines normal to said concave mirror at respective points where said principal rays are incident on said concave mirror.

14. An image display apparatus according to claim 8, wherein said ocular optical system has a configuration that is symmetric with respect to a certain plane and that satisfies the following condition:

$$|\phi_1 - \phi_2| < 2° \quad (12)$$

where $\phi_1$ and $\phi_2$ are incident angles made between, on the one hand, principal rays emitted from both ends of a section of said image display device taken along said plane and, on the other hand, lines normal to said concave mirror at respective points where said principal rays are incident on said concave mirror.

15. An image display apparatus according to claim 8, wherein said ocular optical system has a configuration that is symmetric with respect to a certain plane and that satisfies the following condition:

$$||\phi_1 - \phi_0| - |\phi_2 - \phi_0|| < 2° \quad (13)$$

where $\phi_1$ and $\phi_2$ are incident angles made between, on the one hand, principal rays emitted from both ends of a section of said image display device taken along said plane and, on the other hand, lines normal to said concave mirror at respective points where said principal rays are incident on said concave mirror, and $\phi_0$ is an incident angle made between a principal ray emitted from a center of said image display device and a line normal to said concave mirror at a point where said principal ray is incident on said concave mirror.

16. An image display apparatus according to claim 8, wherein said ocular optical system has a configuration that is symmetric with respect to a certain plane and that satisfies the following condition:

$$||\phi_1 - \phi_0| - |\phi_2 - \phi_0|| < 0.7° \quad (14)$$

where $\phi_1$ and $\phi_2$ are incident angles made between, on the one hand, principal rays emitted from both ends of a section of said image display device taken along said plane and, on the other hand, lines normal to said concave mirror at respective points where said principal rays are incident on said concave mirror, and $\phi_0$ is an incident angle made between a principal ray emitted from a center of said image display device and a line normal to said concave mirror at a point where said principal ray is incident on said concave mirror.

17. An image display apparatus according to claim 8, wherein said ocular optical system has a configuration that is symmetric with respect to a certain plane and that satisfies the following condition:

$$||\phi_1 - \phi_0| - |\phi_2 - \phi_0|| < 0.35° \quad (15)$$

where $\phi_1$ and $\phi_2$ are incident angles made between, on the one hand, principal rays emitted from both ends of a section of said image display device taken along said plane and, on the other hand, lines normal to said concave mirror at respective points where said principal rays are incident on said concave mirror, and $\phi_0$ is an incident angle made between a principal ray emitted from a center of said image display device and a line normal to said concave mirror at a point where said principal ray is incident on said concave mirror.

18. An image display apparatus according to claim 1 or 4, wherein said ocular optical system has at least three surfaces, said at least three surfaces including a third surface provided to face said image display device, a second surface which is a concave mirror provided to face an observer's eyeball at a tilt to the visual axis, and a first surface provided between said second surface and said observer's eyeball, wherein light rays emitted from said image display device enter said ocular optical system through said third surface and are reflected by said first surface and then reflected by said second surface, and thereafter, the reflected light rays pass through said first surface to enter said observer's eyeball without forming an intermediate image.

19. An image display apparatus according to claim 18, wherein said third surface has a rotationally asymmetric surface configuration.

20. An image display apparatus according to claim 18, wherein said third surface has an asymmetric surface configuration in which it has a positive refracting power in a center thereof, and the positive refracting power weakens or changes to a negative refracting power as a distance from the center of said third surface increases toward a periphery thereof.

21. An image display apparatus according to claim 18, wherein said image display device is tilted with respect to said third surface.

22. An image display apparatus according to claim 18, wherein said image display device is tilted such that a distance between said third surface and an end of said image display device that is remote from said observer's eyeball is shorter than a distance between said third surface and an end of said image display device closer to said observer's eyeball.

23. An image display apparatus according to claim 18, wherein a center of a surface configuration of said third surface is displaced toward said observer's eyeball.

24. An image display apparatus according to claim 18, wherein a center of a surface configuration of said first surface is displaced toward said image display device.

25. An image display apparatus according to claim 18, wherein a center of surface configuration of said first surface is not within an effective area.

26. An image display apparatus according to claim 18, wherein, in said ocular optical system, said third surface has a positive refracting power for light rays transmitted therethrough; said first surface has a negative refracting power for light rays reflected thereby; said second surface has a positive refracting power for light rays reflected thereby; and said first surface has a negative refracting power for light rays transmitted therethrough.

27. An image display apparatus according to claim 1 or 4, wherein said ocular optical system has at least four surfaces, said at least four surfaces including a third surface provided to face said image display device, a second surface which is a concave mirror provided to face an observer's eyeball at a tilt to the visual axis, a first surface provided between said second surface and said observer's eyeball, and a fourth surface which is a reflecting surface provided to face said second surface, wherein light rays emitted from said image display device enter said ocular optical system through said third surface and are reflected by said fourth surface and then reflected by said second surface, and thereafter, the reflected light rays pass through said first surface to enter said observer's eyeball without forming an intermediate image.

28. An image display apparatus according to claim 1 or 4, wherein said ocular optical system has at least three surfaces, wherein light rays emitted from said image display device are reflected at least four times by said at least three surfaces to reach an observer's eyeball without forming an intermediate image, and wherein at least one of at least four reflecting surfaces is a concave mirror provided to face said observer's eyeball at a tilt to the visual axis.

29. An image display apparatus according to claim 28, wherein said ocular optical system includes, in order from an image display device side thereof, a first transmitting surface, a first reflecting surface, a second reflecting surface, a third reflecting surface, a fourth reflecting surface, and a second transmitting surface, said fourth reflecting surface being a concave mirror provided to face said observer's eyeball at a tilt to the visual axis.

30. An image display apparatus according to claim 29, wherein, in said ocular optical system, said first transmitting surface and said second reflecting surface are disposed at the same position and with the same configuration, and said second transmitting surface, said first reflecting surface and said third reflecting surface are disposed at the same position and with the same configuration.

31. An image display apparatus according to claim 29, wherein, in said ocular optical system, said first transmitting surface, said second reflecting surface and said second transmitting surface are disposed at the same position and with the same configuration, and said first reflecting surface and said third reflecting surface are disposed at the same position and with the same configuration.

32. An image display apparatus according to claim 1 or 4, wherein said ocular optical system has a semitransparent surface tilted with respect to the visual axis, and a concave mirror provided to face an observer's eyeball, and wherein light rays emitted from said image display device are reflected by said semitransparent surface and then reflected by said concave mirror, and thereafter, the reflected light rays pass through said semitransparent surface to enter said observer's eyeball without forming an intermediate image.

33. An image display apparatus according to claim 1 or 4, wherein said ocular optical system has a semitransparent surface tilted with respect to the visual axis, and a concave mirror provided to face said image display device, and wherein light rays emitted from said image display device pass through said semitransparent surface and are reflected by said concave mirror and then reflected by said semitransparent surface to enter an observer's eyeball without forming an intermediate image.

34. An image display apparatus according to claim 1 or 4, wherein said ocular optical system uses a beam splitter prism having a semitransparent surface.

35. An image display apparatus according to claim 1 or 4, wherein said ocular optical system has at least four surfaces, said at least four surfaces including a third surface provided to face said image display device, a second surface which is a concave mirror provided to face an observer's eyeball at a tilt to the visual axis, a first surface provided between said second surface and said observer's eyeball, and a fifth surface which is a reflecting surface provided to face said first surface, and wherein light rays emitted from said image display device enter said ocular optical system through said third surface and are reflected successively by said fifth surface, said first surface and said second surface, and thereafter, said reflected light rays pass through said first surface to enter said observer's eyeball without forming an intermediate image.

36. An image display apparatus according to claim 1 or 4, wherein said ocular optical system leads an image to each of observer's left and right eyes.

37. An image display apparatus according to claim 1 or 4, further comprising a support member that enables said image display apparatus to be fitted on at least one of an observer's head or face.

* * * * *